United States Patent
Oh et al.

(10) Patent No.: US 11,292,651 B2
(45) Date of Patent: Apr. 5, 2022

(54) PROTECTIVE FILM ATTACHABLE TO ELECTRONIC DEVICE, AND PROTECTIVE FILM PACKAGE INCLUDING SAME

(71) Applicant: Samsung Electronics Co., Ltd., Gyeonggi-do (KR)

(72) Inventors: Jeeyoung Oh, Gyeonggi-do (KR); Younggyun Kim, Gyeonggi-do (KR); Hoyoung Lee, Gyeonggi-do (KR); Taedoo Choung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/982,692

(22) PCT Filed: Mar. 26, 2019

(86) PCT No.: PCT/KR2019/003486
§ 371 (c)(1),
(2) Date: Sep. 21, 2020

(87) PCT Pub. No.: WO2019/194449
PCT Pub. Date: Oct. 10, 2019

(65) Prior Publication Data
US 2021/0002054 A1 Jan. 7, 2021

(30) Foreign Application Priority Data
Apr. 3, 2018 (KR) ........................ 10-2018-0038655

(51) Int. Cl.
*B65D 65/40* (2006.01)
*B65D 81/133* (2006.01)
(Continued)

(52) U.S. Cl.
CPC .............. *B65D 81/133* (2013.01); *B32B 7/12* (2013.01); *B65D 65/40* (2013.01); *B65D 85/68* (2013.01);
(Continued)

(58) Field of Classification Search
CPC ...... B65D 81/133; B65D 65/40; B65D 85/68; B65D 2581/02; B65D 2585/86; B32B 7/12; B32B 2307/412; B32B 2553/00
See application file for complete search history.

(56) References Cited

U.S. PATENT DOCUMENTS

2007/0021068 A1* 1/2007 Dewhurst .............. G11B 31/02
455/42
2010/0270189 A1* 10/2010 Pedersen, II .......... G06F 1/1626
206/320
(Continued)

FOREIGN PATENT DOCUMENTS

| KR | 20-0466333 Y1 | 4/2013 |
| KR | 10-1517186 B1 | 5/2015 |

(Continued)

*Primary Examiner* — Jacob K Ackun
(74) *Attorney, Agent, or Firm* — Cha & Reiter, LLC.

(57) ABSTRACT

According to an embodiment of the present invention, a protective film package includes a tray including a recess for seating an electronic device including a front plate exposing the display, a protective film, attached to the front plate of the electronic device, including a photo-curing layer, and a photo-curing support structure detachably coupled to the electronic device wherein the protective film is disposed at a predetermined position on the front plate when the tray on which the electronic device is seated and the protective film are aligned, and at least a portion of the edge of the protective film is pressed to the front plate by the photo-curing support structure when the photo-curing support
(Continued)

structure is coupled with the electronic device on which the protective film is disposed. Various other embodiments are possible.

15 Claims, 23 Drawing Sheets

(51) Int. Cl.
    *B32B 7/12*     (2006.01)
    *B65D 85/68*     (2006.01)

(52) U.S. Cl.
    CPC ..... *B32B 2307/412* (2013.01); *B32B 2553/00* (2013.01); *B65D 2581/02* (2013.01); *B65D 2585/86* (2013.01)

(56) References Cited

U.S. PATENT DOCUMENTS

| | | | |
|---|---|---|---|
| 2012/0055826 A1* | 3/2012 | Nishimura | H05K 5/0017 206/320 |
| 2013/0341222 A1* | 12/2013 | Lin | B65D 75/322 206/320 |
| 2014/0262875 A1* | 9/2014 | Carnevali | H04M 1/0283 206/320 |
| 2018/0272669 A1 | 9/2018 | Kim et al. | |
| 2021/0045510 A1* | 2/2021 | Okada | G06F 1/1656 |

FOREIGN PATENT DOCUMENTS

| | | |
|---|---|---|
| KR | 10-1718084 B1 | 5/2017 |
| KR | 10-1758768 B1 | 7/2017 |
| KR | 10-2017-0104686 A | 9/2017 |
| KR | 10-2018-0106668 A | 10/2018 |

\* cited by examiner

PROTECTIVE FILM ATTACHABLE TO ELECTRONIC DEVICE, AND PROTECTIVE FILM PACKAGE INCLUDING SAME

CROSS REFERENCE TO RELATED APPLICATIONS

This application is a National Phase Entry of PCT International Application No. PCT/KR2019/003486, which was filed on Mar. 26, 2019, and claims a priority to Korean Patent Application No. 10-2018-0038655, which was filed on Apr. 3, 2018 the contents of which are incorporated herein by reference.

TECHNICAL FIELD

Various embodiments of the present invention relates to a protective film package that is attachable to an electronic device and a protective film package including the same.

BACKGROUND ART

A display included in an electronic device such as a smart phone is damaged by an external impact caused by a drop of the electronic device or the like. A protective film is attached to one surface of the electronic device to which the display is exposed, and the protective film reduces external shock transmission to the display and prevent surface damage (e.g., scratch) of the display.

DISCLOSURE OF INVENTION

Technical Problem

It is difficult to accurately align and attach the protective film on the electronic device. In addition, when one surface of the electronic device to which the protective film and the display are exposed is not in close contact with the protective film and there are bubbles or floats therebetween, these bubbles do not make the appearance beautiful, but also reduce the visibility of light generated from the display.

Various embodiments of the present invention provide a protective film and a protective film package including the same to enable easy and seamless coupling of the protective film to the exact location of the electronic device.

Solution to Problem

According to an embodiment of the present invention, the protective film package includes a tray including a recess capable of seating an electronic device including a front plate exposing a display, a protective film including a photo-curing layer wherein the protective film is attached to the front plate of the electronic device, and a photo-curing support structure detachably coupled to the electronic device wherein the protective film is disposed at a predetermined position on the front plate when the tray on which the electronic device is seated and the protective film are aligned, and at least a portion of an edge of the protective film is pressed to the front plate by the photo-curing support structure when the photo-curing support structure is combined with the electronic device on which the protective film is disposed.

Advantageous Effects of Invention

Various embodiments of the present invention easily combine the protective film in the exact position of the electronic device without gaps, thereby increasing satisfaction when attaching the protective film.

BEST MODE FOR CARRYING OUT THE INVENTION

Figure 1A:
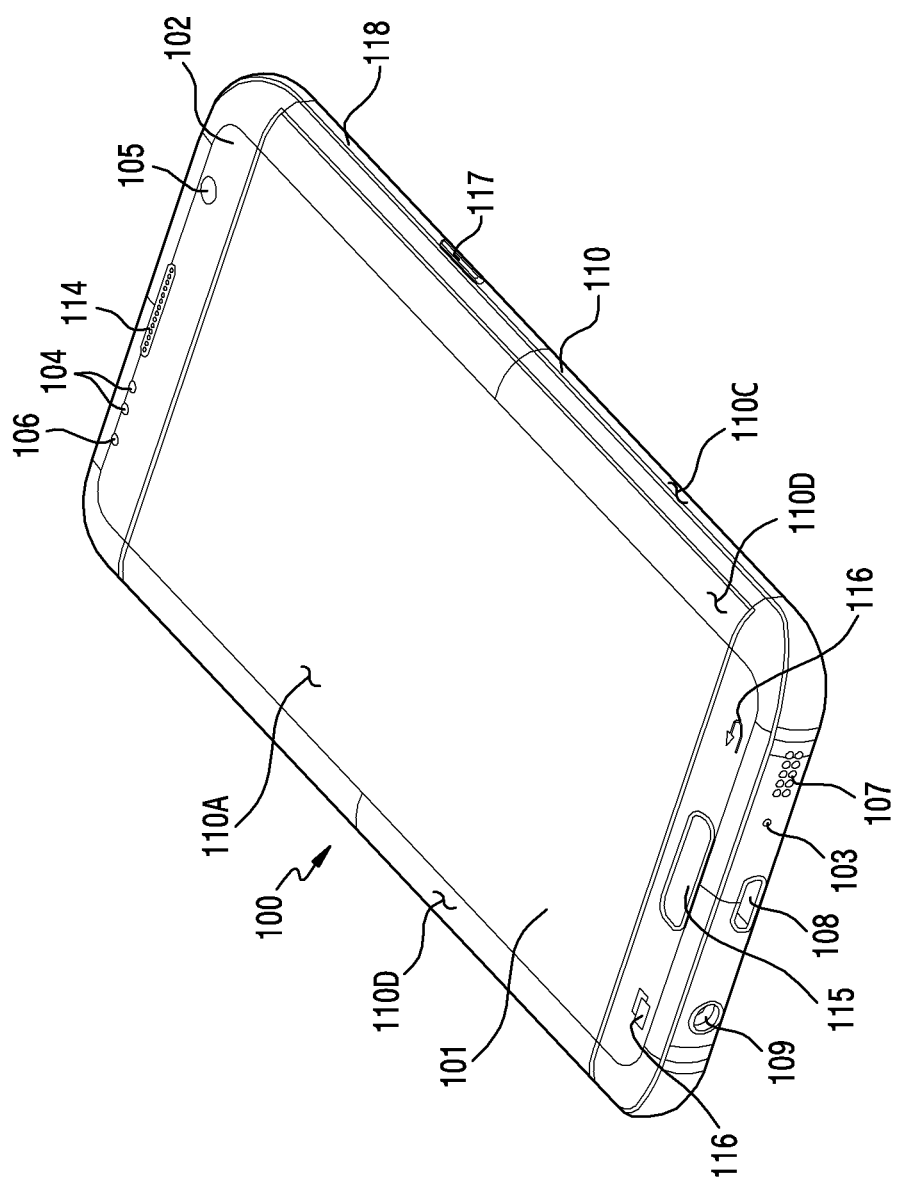
FIG. 1A is a perspective view of a front surface of a mobile electronic device including a protective film according to an embodiment.

Embodiments of the present disclosure are described herein below with reference to the accompanying drawings. However, the embodiments of the present disclosure are not limited to the embodiments and should be construed as including all modifications, changes, equivalent devices and methods, and/or alternative embodiments of the present disclosure. In drawings, for convenience of description, sizes of components may be exaggerated for clarity. For example, since sizes and thicknesses of components in drawings are arbitrarily shown for convenience of description, the sizes and thicknesses are not limited thereto. Also, a Cartesian coordinate system is used, where the x-axis direction refers to the horizontal direction of the electronic device, the y-axis refers to the vertical direction of the electronic device, and the z-axis refers to the thickness direction of the electronic device. However, the x-axis, y-axis, and z-axis are not limited to three axes on the Cartesian coordinate system, and can be interpreted in a broad sense including them. For example, the x-axis, y-axis, and z-axis may be orthogonal to each other, but may refer to different directions that are not orthogonal to each other. In connection with the description of the drawings, similar reference numerals may be used for similar elements.

The terms "have," "has," "include," and "includes" as used herein indicate the presence of corresponding features (e.g., elements such as numerical values, functions, operations, or parts), but do not preclude the presence of additional features.

The terms "A or B," "at least one of A and/or B," or "one or more of A and/or B" as used herein include all possible combinations of items enumerated with them. For example, "A or B," "at least one of A and B," or "at least one of A or B" indicates (1) including at least one A, (2) including at least one B, or (3) including both at least one A and at least one B.

The terms such as "first" and "second" as used herein may modify various elements regardless of an order and/or importance of the corresponding elements, but do not limit the corresponding elements. These terms is used for the purpose of distinguishing one element from another element. For example, a first user device and a second user device may indicate different user devices regardless of the order or importance. For example, a first element is referred to as a second element without departing from the scope and spirit the present disclosure, and similarly, a second element is referred to as a first element.

It will be understood that, when an element (e.g., a first element) is "(operatively or communicatively) coupled with/to" or "connected to" another element (e.g., a second element), the element is directly coupled with/to another element, and there is an intervening element (e.g., a third element) between the element and another element. To the contrary, it will be understood that, when an element (e.g., a first element) is "directly coupled with/to" or "directly connected to" another element (e.g., a second element), there is no intervening element (e.g., a third element) between the element and another element.

The expression "configured to (or set to)" as used herein is replaced with "suitable for," "having the capacity to," "designed to," "adapted to," "made to," or "capable of" according to a context. The expression "configured to (set to)" does not necessarily indicate "specifically designed to" in a hardware context. Instead, the expression "apparatus configured d to" may indicate that the apparatus is "capable of" along with other devices or parts in a certain context. For example, "a processor configured to (set to) perform A, B, and C" may indicate a dedicated processor (e.g., an embedded processor) for performing a corresponding operation, or a general purpose processor (e.g., a central processing unit (CPU) or an application processor) capable of performing a corresponding operation by executing one or more software programs stored in a memory device.

The terms used in describing the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein have the same meanings as those generally understood by a person of ordinary skill in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in the present disclosure should not be interpreted as excluding the embodiments of the present disclosure.

An electronic device according to the embodiments of the present disclosure includes at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group audio layer 3 (MP3) player, a mobile medical machine, a camera, or a wearable device (e.g., smart glasses, a head-mounted-device (HMD), electronic clothing, an electronic bracelet, an electronic necklace, an electronic appcessory, electronic tattoos, a smart mirror, or a smart watch).

An electronic device is a smart home appliance. For example, a smart home appliance includes at least one of a television, a digital video disk (DVD) player, a stereo, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV®, or Goggle TV), a game console (e.g., Xbox®, PlayStation®), an electronic dictionary, an electronic key, a camcorder, or an electronic album.

An electronic device may also include at least one of various medical machines (e.g., various portable medical measurement devices (such as a glucose monitor, a heart rate monitor, a blood pressure measuring device, or a thermometer), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (such as navigation equipment for ship, a gyro compass, and the like), avionics, a security device, a head unit for vehicles, an industrial or home robot, an automatic teller machine (ATM) of a financial institution, point of sale (POS) device of a store, or IoT (e.g., a lamp, various sensors, an electric or gas meter, a sprinkler, a fire alarm, a thermostat, a streetlamp, a toaster, an exercise machine, a hot water tank, a heater, a boiler, etc.).

An electronic device may further include at least one of a part of furniture or a building/structure, an electronic board, an electronic signature receiving device, a projector, and various measurement devices (such as devices for measuring water, power, gas, radio waves, and the like). An electronic device is one or a combination of one or more of the above-mentioned devices. In addition, an electronic device is a flexible electronic device. In addition, an electronic device according to the present disclosure is not limited to the above-mentioned devices, and includes new electronic devices according to the development of new technologies.

Figure 1B:
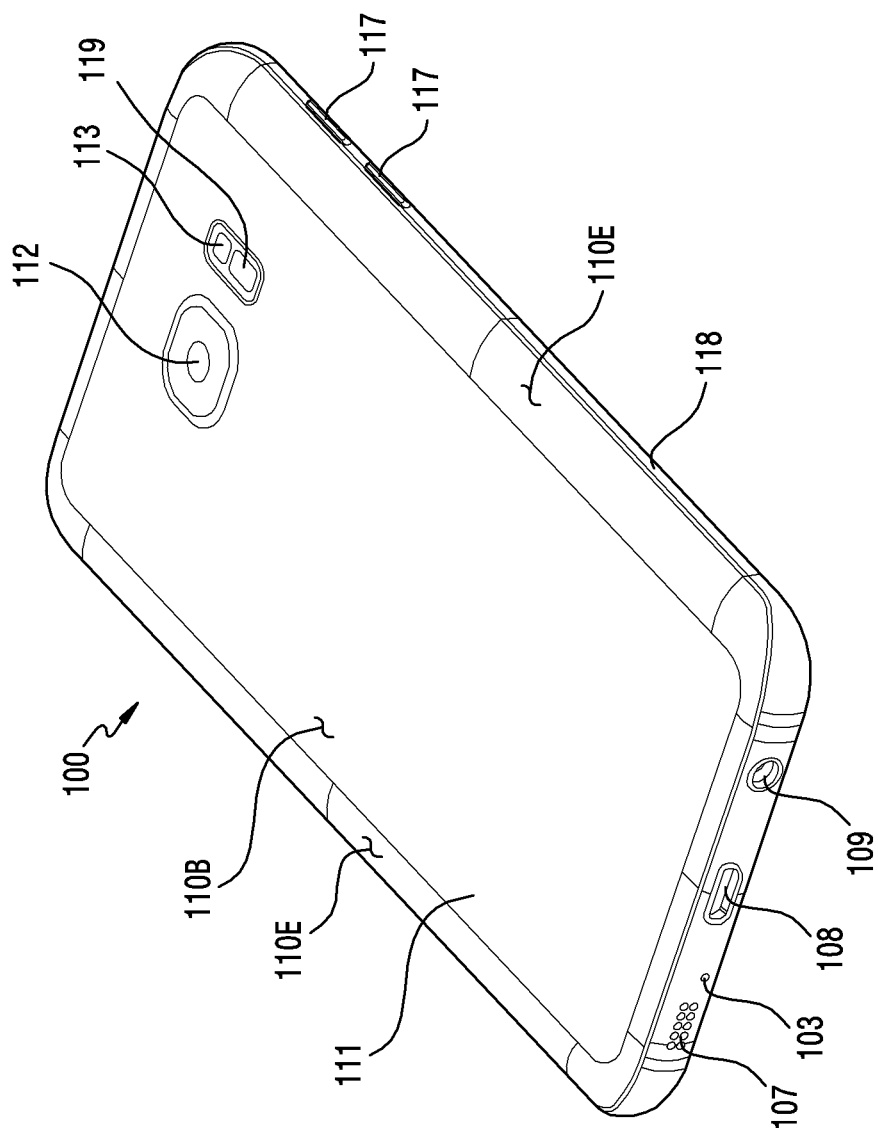
FIG. 1B is a perspective view of the rear surface of the electronic device of FIG. 1A.

FIG. 1A is a front perspective view illustrating an example mobile electronic device having a protective film according to various embodiments. FIG. 1B is a rear perspective view illustrating an example mobile electronic device of FIG. 1A.

Referring to FIG. 1A and FIG. 1B, an electronic device 100 according to an embodiment includes a housing 110 including a first side (or a front side) 110A, a second side (or a rear side) 110B, and a lateral side (surface) 110C surrounding a space between the first side 100A and the second side 110B. In another embodiment (not shown), the housing may refer to a structure which includes part of the first side 110A, second side 110B, and third side 110C of FIG. 1A. According to an embodiment, the first side 110A is constructed of a front plate 102 (or a front cover) (e.g., a polymer plate or a glass plate having various coating layers) which is at least partially transparent. The second side 110B is constructed of a rear plate 111 (or a rear cover) which is opaque. For example, the rear plate 111 is constructed, for example, and without limitation, of coated or colored glass, ceramic, polymer, metallic materials (e.g. aluminum, stainless steel (STS), or magnesium), a combination of at least two of these materials, or the like. The lateral side 110C (or a side member or side surface) is constructed of a lateral bezel structure (or a lateral member) 118 bonded to the front plate 102 and the rear plate 111 and including, for example, and without limitation, metal and/or polymer. In some embodiments, the rear plate 111 and the lateral bezel structure 118 is constructed integrally and includes the same material (e.g., a metallic material such as aluminum).

In the illustrated embodiment, the front plate 102 includes a first area 110D that bends from the first side 110A toward the rear plate and extends seamlessly, at both end of a long edge of the front plate. In the illustrated embodiment (referring FIG. 1B), the rear plate 111 includes a second area 110E that extends from the second side 110B toward the front plate and extends seamlessly, at both ends of the long edge. In various example embodiments, the front plate or the rear plate comprises only one of the first area or the second area. In various example embodiments, the front plate 102 does not include a first area and a second area, and includes only a flat plane disposed in parallel with the second side 110B. In the above embodiments, as viewed from the side of the electronic device, the lateral bezel structure has a first thickness (or width) on the side where the first area or the second area is not included, and a second thickness that is thinner than the first thickness on the side including the first area or the second area.

According to an embodiment, the electronic device 100 includes, for example, and without limitation, at least one or more of a display 101, an input device 103, audio output devices 107, and 114, sensor modules 104, 119, camera modules 105, 112, and 113, and key input devices 115, 116 and 117, an indicator 106, and connector holes 108 and 109. In various example embodiments, the electronic device 100 may omit at least one (e.g., the key input devices 115, 116 and 117 or the indicator 106) of these components or may additionally include other components.

The display 101 is exposed through, for example, some portions of the front plate 102. In an example embodiment, A portion of the display 101 is exposed through the front plate 102 forming the first side 110A and the first area 110D of the lateral side 110C. The display 101 is disposed adjacent to or bonded to, for example, and without limitation, a touch sensing circuit, a pressure sensor capable of measuring touch strength (pressure), and/or a digitizer for detecting a stylus pen of a magnetic field type. In an example embodiment, at least portion of the sensor modules 104, 119 and/or at least portion of the key input devices are disposed on the first portion 110D and/or the second portion 110E.

The audio modules 103, 107, and 114 includes a microphone hole 103 and speaker holes 107 and 114. A microphone for acquiring external sound is disposed inside the microphone hole 103. In some embodiments, a plurality of microphones is disposed to sense a direction of the sound. The speaker holes 107 and 114 includes the external speaker hole 107 and the receiver hole 114 for a call. In some embodiments, the speaker holes 107 and 114 and the microphone hole 103 is implemented as a single hole, or a speaker (e.g., a piezo speaker) is included without the speaker holes 107 and 114.

The sensor modules 104 and 119 may generate an electrical signal or data value corresponding to an internal operating state of the electronic device 100 or an external environmental state. The sensor modules 104 and 119 includes, for example, the first sensor module 104 (e.g., a proximity sensor) and/or second sensor module (not shown) (e.g., a fingerprint sensor) disposed to the first side 110A of the housing 110, and/or the third sensor module 119 (e.g., an HRM sensor) disposed to the second side 110B of the housing 110. The fingerprint sensor is disposed to a portion of the first side 110A (e.g., a home key button 115) or the second side 110B of the housing or below the display 101. The electronic device 100 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 104, or the like.

The camera modules 105, 112, and 113 includes the first camera device 105 disposed to the first side 110A of the electronic device 100, the second camera device 112 disposed to the second side 110B, and/or the flash 113. The camera modules 105 and 112 includes one or more lenses, an image sensor, and/or an image signal processor. The flash 113 includes, for example, and without limitation, a Light Emitting Diode (LED), a xenon lamp, or the like. In some embodiments, two or more lenses (wide angle and telephoto lenses) and image sensors is disposed to one side of the electronic device 100.

The key input devices 115, 116, and 117 includes the home key button 115 disposed to the first side 110A of the housing 110, the touch pad 116 disposed around the home key button 115, and/or the side key button 117 disposed to the lateral side 110C of the housing 110. In another embodiment, the electronic device 100 may not include some or all of the aforementioned key input devices 115, 116, and 117. The key input devices 115, 116, and 117, which are not included, is implemented using a soft key displayed on the display 101 or a in a pressure sensor included in the display 101.

The indicator 106 is disposed to, for example, the first side 110A of the housing 110. The indicator 106 may provide, for example, state information of the electronic device 100 in an optical form and includes an LED (light emitting diode).

The connector holes 108 and 109 includes the first connector hole 108 capable of accommodating a connector (e.g., a USB connector) for transmitting/receiving power and/or data of an external electronic device and/or the second connector hole or earphone jack 109 capable of accommodating a connector for transmitting/receiving an audio signal with respect to the external electronic device.

According to an embodiment, the electronic device 100 includes a protective film (not shown) coupled to the front plate 102. The protective film includes at least one layer, and is tightly attached to the first surface 110A formed by the front plate 102 and the first areas 110D of the side surface 110C. According to some embodiments, the front plate 102 is defined as an element including a protective film.

According to an embodiment, the protective film is coupled to the front plate 102 using a light-transmitting adhesive member as a medium. According to an embodiment, the adhesive member is an adhesive film (e.g., pressure sensitive adhesive). According to another embodiment, the adhesive member is a photo-curing member including a material that is cured in response to a light. According to some embodiments, the protective film is defined as an element including an adhesive member.

According to an embodiment, the protective film has flexibility so that the protective film is disposed along the first surface 110A of the front plate 102 and the first areas 110D that are extended from the first surface 110A and bent.

According to an embodiment, the protective film has various optical properties such as light transmittance, refractive index, or dispersion rate. According to an embodiment, the protective film is formed of a film having a transmittance of about 90% or more. According to various embodiments, the light output from the display 101 may not be totally reflected by the interface or the coupling layer (coupling surface) between the protective film and the front plate 102.

According to various embodiments, a protective film is designed to reduce the amount of the reflected light emitted to the outside when external light such as sunlight is reflected by a metal material (e.g., electrode) included in the display 101. Thereby, outdoor visibility is secured by this kind design. For example, the protective film includes a material that does not pass a specific wavelength band, such as ultraviolet rays or infrared rays.

According to various embodiments, the protective film is designed to have zero or near zero surface flatness or surface roughness. For example, the protective film includes a surface coupled to the front plate 102 and a surface exposed to the outside, and the average roughness value Ra or the maximum roughness value Rmax of at least one of the two surfaces is less than or equal to 5 μm.

According to various embodiments, the protective film includes a material having electrical insulation properties. For example, the protective film is formed of a material having a relatively low dielectric constant to prevent an energy loss. For example, the protective film is formed of a material having a small dielectric loss. For example, since sodium ions and the like can carry charges (ion conduction) under the action of an electric field, the protective film is formed of a material having a low alkali content such as a sodium.

According to various embodiments, the protective film includes various materials that have further properties such as a mechanical strength (e.g., tensile strength, modulus of elasticity, or compressibility) and chemical durability.

According to an embodiment, the protective film includes an opening (not shown) in which the portion aligned with the call receiver hole 114 is removed. According to some embodiments, the protective film includes an opening in which portions aligned with at least one of the first camera device 105, the first sensor module 104, and the light emitting device 106 are removed. According to various embodiments, when the electronic device 100 is designed to include a key input device (e.g., a home button) disposed on the first surface 110A, the protective film is in the form of removing a portion aligned with the key input device.

The electronic device according to the embodiments of the present invention is various types of devices. The electronic device includes, for example, at least one of a portable communication device (e.g., a smart phone), a computer device, a portable multimedia device, a portable medical device, a camera, a wearable device, or a home appliance. The electronic device according to an embodiment of the present invention is not limited to the above-described devices.

Hereinafter, various embodiments in which the protective film is coupled to the front plate 102 will be described in detail with reference to the accompanying drawings. However, for convenience of description, in the drawings, the size of components is exaggerated or reduced. For example, since the size and thickness of each component shown in the drawings are arbitrarily shown for convenience of description, the present invention is not limited to what is shown.

Figure 2A:
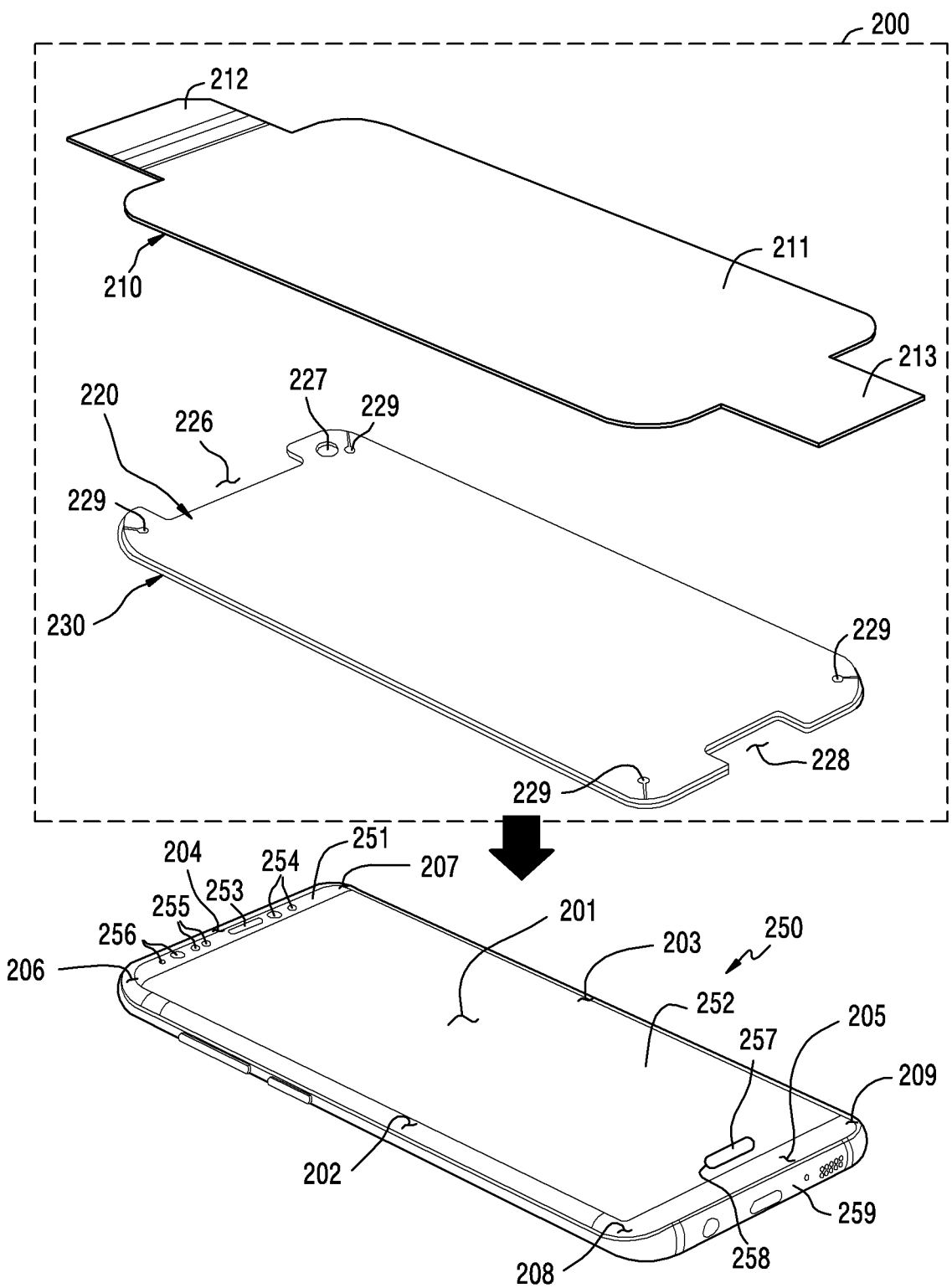
FIG. 2A is a perspective view illustrating a coupling between a protective film and an electronic device using a protective film set according to an embodiment.
Figure 2B:
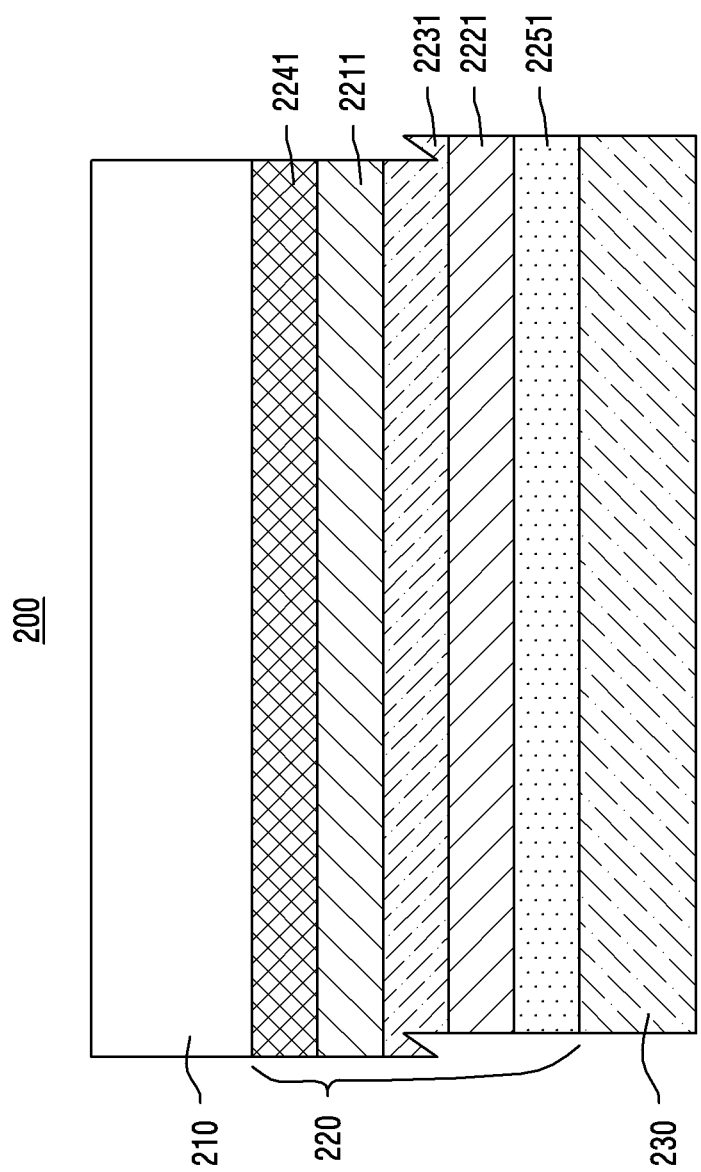
FIG. 2B is a cross-sectional view of the protective film set in FIG. 2A.
Figure 2C:
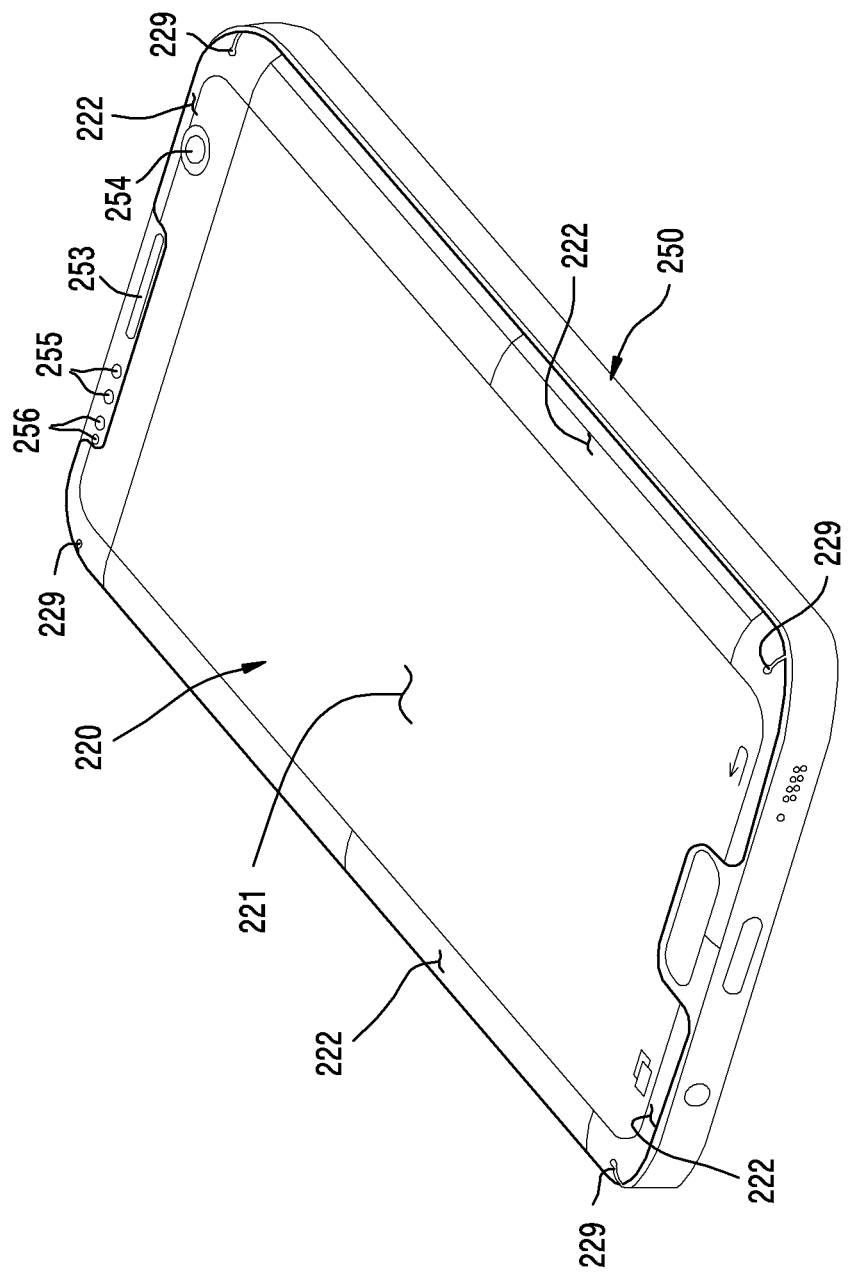
FIG. 2C is a perspective view of an electronic device with a protective film according to an embodiment.

FIG. 2A is a perspective view illustrating a coupling between a protective film and an electronic device using a protective film set according to an embodiment. FIG. 2B is a cross-sectional view of the protective film set in FIG. 2A. FIG. 2C is a perspective view of an electronic device to which protective film is coupled according to an embodiment.

Referring to FIG. 2A and FIG. 2B, the protective film set 200 according to an embodiment includes a base film 210, a release film 230, and a protective film 220 disposed between the base film 210 and the release film 230.

According to an embodiment, the release film 230 refers to a layer detachably coupled to the rear surface of the protective film 220 to protect an adhesive surface formed on a rear surface of the protective film 220. The base film 210 refers to a layer (e.g., a top film or a top tape) which is detachably coupled to the protective film 220, and the rear surface of the protective film 220 includes an adhesive material for holding the protective film 220.

According to an embodiment, a first operation of separating the release film 230 from the protective film set 200 is performed. By the first operation, the base film 210 and the protective film 220 are remained, and the adhesive surface formed on the rear surface of the protective film 220 is exposed to the outside. A second operation of coupling the protective film 220 using the adhesive surface of the protective film 220 to the front plate 251 (e.g., the front plate 102 in FIG. 1A) of the electronic device 250 (e.g., the electronic device 100 in FIG. 1A) is performed. A third operation of separating the base film 210 from the protective film 220 is performed, and the attachment of the protective film 220 is completed.

According to an embodiment, the protective film 220 includes an adhesive layer (e.g., an adhesive film, a pressure sensitive adhesive) forming an adhesive surface on the rear side of the protective film 220.

According to an embodiment, the base film 210 includes an area 211 to which the protective film 220 is attached and one or more tails 212, 213 extending from the area 211. The tails 212, 213 of the base film 210 are utilized to accurately align and attach the base film 210 and the protective film 220 to the front plate 251 in the second operation, or to separate the base film 210 from the protective film 220 in the third operation. For example, the tails 212, 213 are used as a handle to hold by a hand in the second or the third operation. According to an embodiment, the tails 212, 213 include a first tail 212 and a second tail 213 extending opposite to each other, and the first and second tails 212, 213 are used as both handles to facilitate the second operation and/or the third operation. Also, further design for tails to be disposed in various other positions is also possible.

According to an embodiment, the electronic device 250 includes a front plate 251 forming an outer surface of the electronic device 250 and a display 252 exposed through the front plate 251. One surface of the front plate 251 forming the outer surface of the electronic device 250 includes a substantially planar area (hereinafter, a planar area) 201 and edge areas (hereinafter, curved areas) 202, 203, 204, 205, 206, 207, 208, 209 that are curved surfaces (or inclined surfaces) that are smoothly connected to the planar area 201 and inclined in the direction toward a side member 259 (e.g., a side bezel structure 118 in FIG. 1A). The curved areas 202, 203, 204, 205, 206, 207, 208, 209 have the four areas (hereafter, third areas) 202, 203, 204, 205 which are extending straight and disposed along the side member 259 (e.g., side bezel structure 118 in FIG. 1A) and the rounded areas (hereinafter, fourth areas or corner areas) 206, 207, 208, 209 connecting the third areas 202, 203, 204, 205. The third areas 202, 203, 204, 205 include a left area 202, a right area 203, an upper area 204, and a lower area 205. The left area 202 and a right area 203 are parallel to each other, and the upper area 204 and the lower area 205 are parallel to each other.

According to various embodiments, the left area 202 and the right area 203 are designed to be expanded similarly to the first area 110D of the electronic device 100 illustrated in FIG. 1A.

According to an embodiment, the front plate 251 is formed by bending an area corresponding to the curved areas 202, 203, 204, 205, 206, 207, 208, 209 whereby the curved areas 202, 203, 204, 205, 206, 207, 208, 209 are formed. According to another embodiment, the front plate 251 is formed in a shape in which the thickness is reduced by a corresponding inclination in the direction toward the edge of the front plate 251, whereby the curved areas 202, 203, 204, 205, 206, 207, 208, 209 are formed.

According to an embodiment, the left area 202 and the right area 203 of the third areas 202, 203, 204, 205 are curved surfaces having substantially the same inclination (or curvature). The upper area 204 and the lower area 205 of the third areas 202, 203, 204, 205 are curved surfaces having the same or different inclinations (or curvatures).

According to an embodiment, the left area 202 or the right area 203 are curved surface having different inclinations (or curvatures) from the upper area 204 or the lower area 205. For example, the left area 202 is a curved surface having a first inclination, and the lower area 205 is a curved surface having a second inclination different from the first inclination. The area 208 among the fourth areas 206, 207, 208, 209 for connecting the left area 202 and the bottom area 205 is a curved surface for a smooth connection between the left area 202 and the bottom area 205 having different inclinations each other.

According to an embodiment, the protective film 220 includes slits 229 formed in portions corresponding to the fourth areas 206, 207, 208, 209 of the front plate 251. The slits 229 are, when the protective film 220 is attached to the front plate 251, for facilitating the deformation of the protective film 220 corresponding to the planar area 201 and the curved areas 202, 203, 204, 205, 206, 207, 208, 209 of the front plate 251, whereby the protective film 220 and the front plate 251 are tightly coupled.

According to an embodiment, the front plate 251 includes a hole 253 aligned with a call receiver (not shown), a light transmitting area 254 aligned with a camera device (not shown), light transmitting area 255 aligned with an optical sensor, a light transmitting area 256 aligned with the light emitting device, or a hole 258 supporting a button (e.g., a home button) 257. The hole 253 and the light transmitting areas 254, 255, 256 are disposed next to the display 252. According to some embodiments, these light transmitting areas 254, 255, 256 are replaced with holes. According to an embodiment, the protective film 220 is formed to have shapes 226, 227, 228 in which portions corresponding to the holes 253, 258 and the light transmitting area 255 of the front plate 251 are removed. These shapes 226, 227, 228 enable the receiver, camera device, optical sensor, light emitting device and button 257 to properly function. For example, assuming the case where the protective film 220 covers the light transmitting area 254 of the front plate 251, external light entering the camera device is undesirably refracted, reflected, absorbed or attenuated by the protective film 220 and the camera device is difficult to function properly. For another example, assuming the case where the protective film 220 covers the light transmitting area 255 of the front plate 251, light output from the light source included in the optical sensor or external light entering the optical sensor is undesirably refracted, reflected, absorbed or attenuated by the protective film 220, and the optical sensor is difficult to function properly.

According to some embodiments, when the protective film 220 has optical properties (e.g., light transmittance) which do not degrade the functions of the camera device, the optical sensor, or the light emitting device, it is possibly designed that the protective film 220 covers the light transmitting areas 254, 255, 256.

According to some embodiments, when the button 257 is replaced by a soft key on the display 252, the button 257, the hole 258 of the front plate 251, and the above-described form 228 of the protective film 220 are omitted.

Referring to FIG. 2A and FIG. 2C, when the protective film 220 is accurately aligned and coupled to the front plate 251, a portion 221 of the protective film 220 is attached to the planar area 201 of the front plate 251 and another portion (or edge area) 222 of the protective film 220 is attached to the curved areas 202, 203, 204, 205, 206, 207, 208, 209 of the front plate 251.

Referring to FIG. 2B, the protective film 220 according to an embodiment includes a first base layer 2211, a second base layer 2221 disposed below the first base layer 2211, and a photo-curing layer (or an optical adhesive layer) 2231 disposed between the first base layer 2211 and the second base layer 2221. The protective film 220 includes a hard coating layer 224 disposed on the first base layer 2211 and an adhesive layer 2251 (e.g., PSA, pressure sensitive adhesive] disposed below the second base layer 2221. According to various embodiments, the first base layer 2211, the second base layer 2221, the photo-curing layer 2231, the hard coating layer 2241 or the adhesive layer 2251 are formed of a variety of polymers. The photo-curing layer 2231 includes material (e.g., a photo-curing resin) which is cured by reaction of a light (e.g., a light for a given bandwidth or a natural light).

According to an embodiment, in the first operation, the release film 230 is separated from the protective film set 200. By the first operation, the base film 210 and the protective film 220 are remained and the adhesive layer 2251 is exposed to the outside. In the second operation, the adhesive layer 2251 is coupled to the front plate 251 of the electronic device 250. According to an embodiment, the adhesive layer 2251 has a modulus set to couple tightly between the protective film 220 and the front plate 251. In the second operation, the photo-curing layer 223 is cured using the light. According to an embodiment, the base film 210 has a light transmitting property whereby amount of light required to cure the photo-curing layer 2231 is secured. According to various embodiments, the photo-curing layer 2231 includes a material that requires a post curing without a pre curing such as a provisional curing. When the photo-curing layer 2231 is cured, the protective film 220 maintains in the form corresponding to the planar areas 201 and curved areas 202, 203, 204, 205, 206, 207, 208, 209 of the front plate 251. In the third operation, the base film 210 is separated from the protective film 220.

According to various embodiments, the second operation includes an operation of accurately aligning the base film 210 and the protective film 220 with the front plate 251.

For example, in the second operation, the corresponding portion of the protective film 220 (edge area 222 in FIG. 2C) is excited from the curved areas 202, 203, 204, 205, 206, 207, 208, 209 of the front plate 251 before the photo-curing layer 2231 is fully cured. According to various embodiments, during curing the photo-curing layer 2231, support devices or support structures for preventing excitation of the protective film 220 from the curved areas 202, 203, 204, 205, 206, 207, 208, 209 of the front plate 251 are provided and will be described later with reference to FIGS. 6A, 6B, 6C, 6D, 7A, and 7B.

Figure 3A:
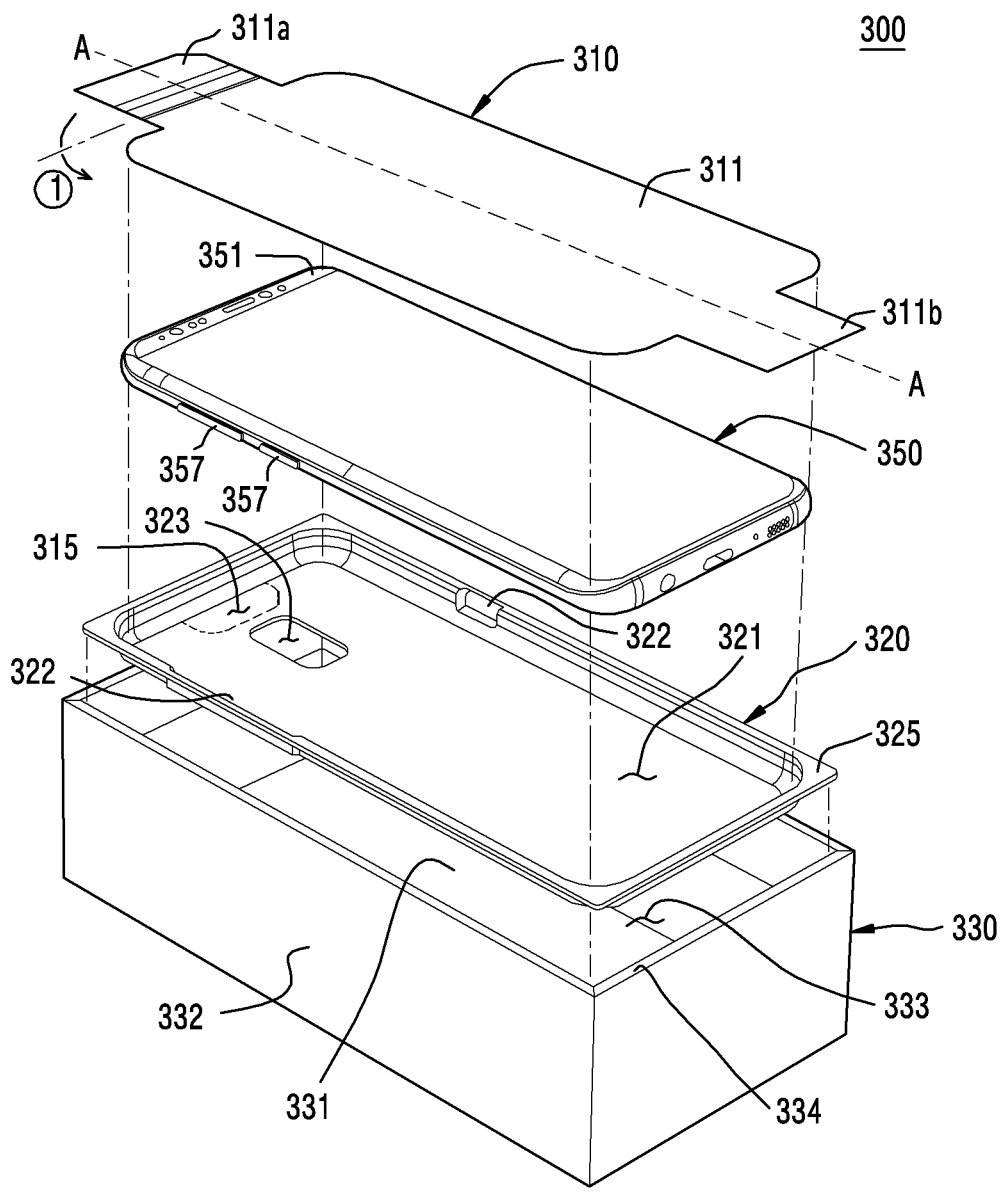
FIG. 3A is a perspective view illustrating a coupling between a protective film and an electronic device using a protective film package according to an embodiment.
Figure 3B:
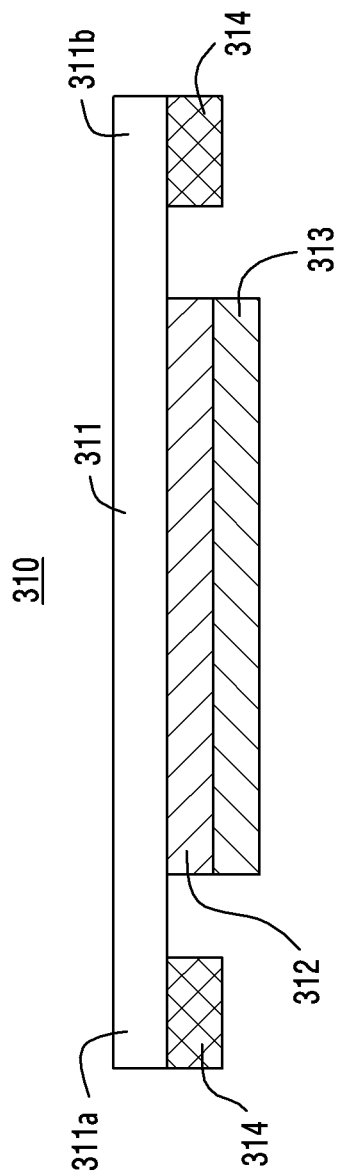
FIG. 3B is a cross-sectional view of the A-A portion of the protective film set included in the protective film package of FIG. 3A.
Figure 3C:
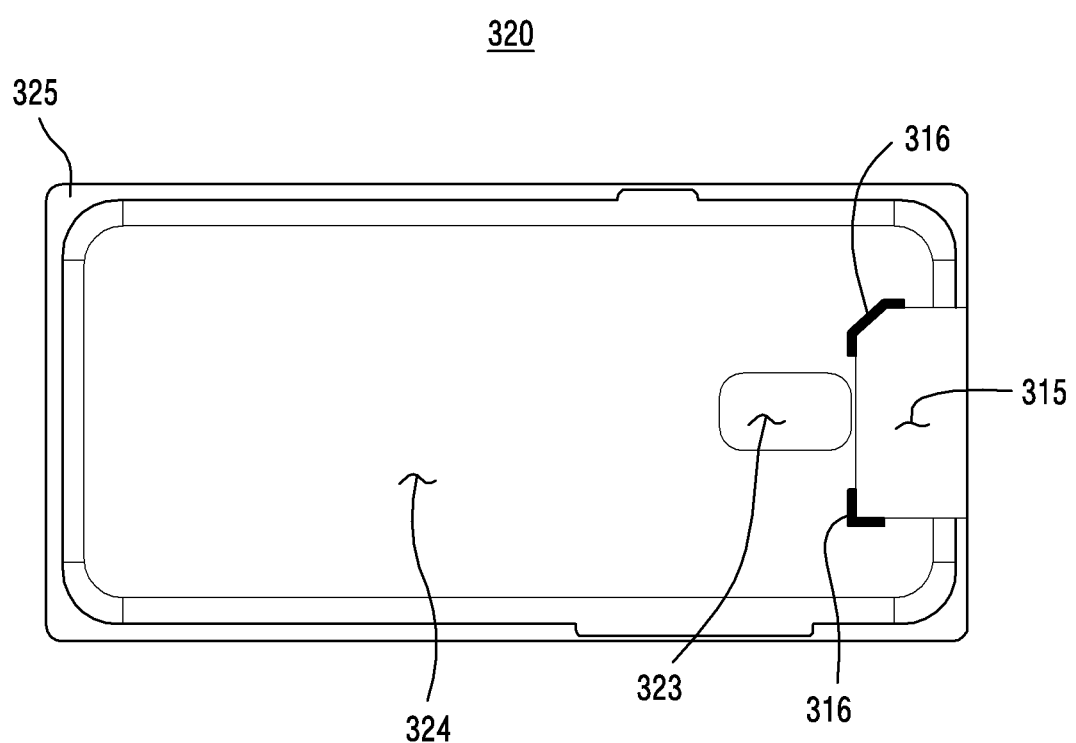
FIG. 3C is a rear view of a tray included in the protective film package of FIG. 3A.
Figure 3D:
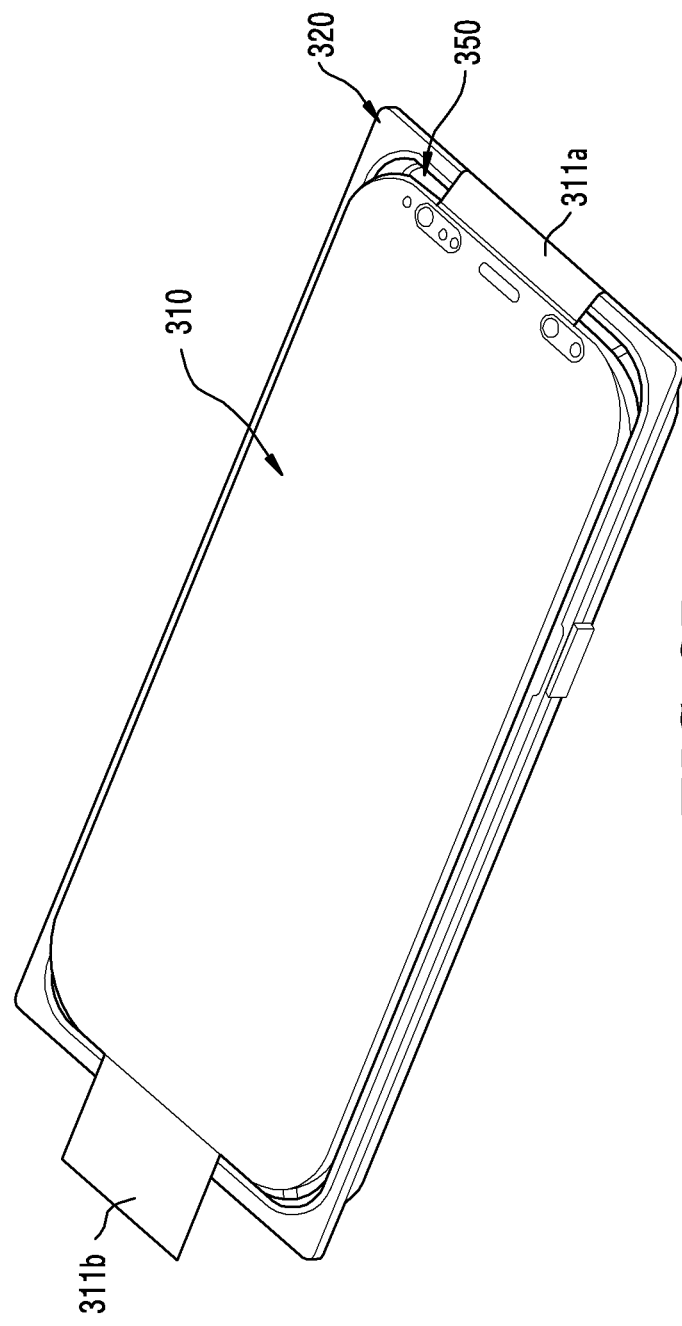
FIG. 3D is a perspective view of a structure in which a protective film set in which a release film is separated is coupled to a tray on which an electronic device is disposed.
Figure 3E:
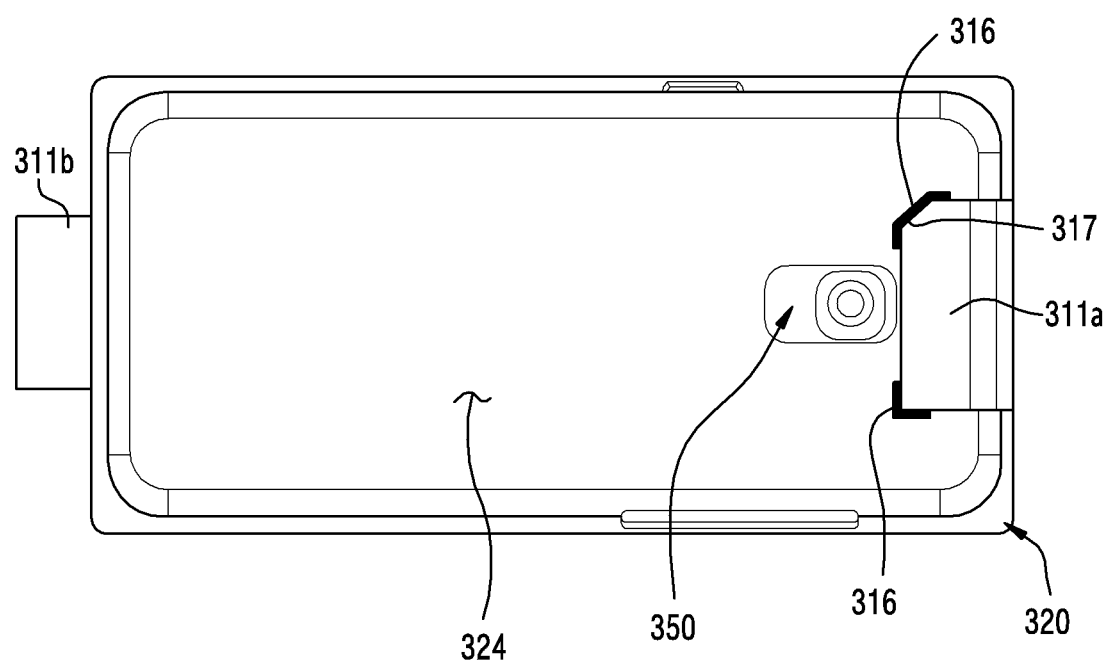
FIG. 3E is a rear view of the structure shown in FIG. 3D.

FIG. 3A is a perspective view illustrating a coupling between a protective film and an electronic device using a protective film package 300 according to an embodiment. FIG. 3B is a cross-sectional view of the A-A portion of a protective film set 310 included in the protective film package in FIG. 3A. FIG. 3C is a rear view of a tray 320 included in the protective film package in FIG. 3A. FIG. 3D is a perspective view of a structure in which the protective film set in which a release film is separated is coupled to the tray on which an electronic device is disposed. FIG. 3E is a rear view of the structure shown in FIG. 3D.

Referring to FIG. 3A and FIG. 3B, the protective film package 300 according to an embodiment includes the protective film set 310 and the tray 320. By disposing the electronic device 350 on the tray 320 (e.g., an electronic device 100 in FIG. 1A) and aligning the protective film set 310 to the tray 320, the protective film 312 included in the protective film set 310 is disposed at a set position on the front plate 351 (e.g., the front plate 102 in FIG. 1A) of the electronic device 350.

Referring to FIG. 3A and FIG. 3B, the protective film set 310 according to an embodiment includes a base film 311, a release film 313, and a protective film 312 disposed between the base film 311 and the release film 313. The release film 313 refers to a layer detachably coupled to the rear surface of the protective film 312 to protect the adhesive surface formed on the rear surface of the protective film 312. The protective film 312 is formed of a structure similar to or the same as the protective film 220 in FIG. 2B. The base film 311 is a layer detachably coupled to the protective film 312, and its rear surface includes an adhesive material for holding the protective film 312.

According to an embodiment, the tray 320 includes a recess 321, and when the electronic device 350 is disposed in the recess 321, the electronic device 350 is in a stable state (or a stable seating state) in the tray 320. The tray 320 serves as a reference for allowing the protective film set 310 to be placed in a position accurately aligned with the electronic device 350. After the electronic device 350 is disposed in the recess 321 of the tray 320, the release film 313 is removed from the protective film set 310 and the remaining base film 311 and protective film 312 are accurately aligned and coupled to the tray 320. The protective film 312 is attached to a set position on the front plate 351 of the electronic device 350.

According to an embodiment, the tray 320 includes a button 357 and a recess 322 or an opening 323 corresponding to a rear camera (not shown) in the electronic device 350.

According to an embodiment, the base film 311 includes an area (not shown) to which the protective film 312 is attached, and a pair of tails 311a, 311b extending opposite to each other from the area. The tails 311a, 311b of the base film 311 are utilized to accurately align and attach the base film 311 and the protective film 312 to the front plate 351, or to be a handle used to separate the base film 311 from the protective film 312.

According to an embodiment, the adhesive layer 314 is disposed on the rear surface of the tails 311a, 311b. Referring to FIGS. 3D and 3E, when the release film 313 is removed from the protective film set 310 and the remaining base film 311 and the protective film 312 are accurately aligned and coupled to the tray 320, the tail 311a is bent (see ① in FIG. 3A) and attached to the rear surface 324 of the tray 320 using the adhesive layer 314 as a medium. As in FIGS. 3D and 3E, only one tail 311a is attached to the rear surface 324 of the tray 320, but is not limited thereto, and the remaining tail 311b is also attached to the rear surface 324 of the tray 320.

In an embodiment, referring to FIGS. 3C and 3E, a guide is provided on the rear surface 324 of the tray 320 to help the tails 311a and 311b be disposed in an accurate position. According to an embodiment, a guide line 316 defining an attachment area 315 of the tail 311a is provided on the rear surface 324 of the tray 320, and thus, the tail 311a is disposed in the accurate position according to the guide line 316. According to various embodiments, a recess defining the attachment area 315 of the tail 311a is formed on the rear surface 324 of the tray 320. According to various embodiments, the attachment area 315 of the tail 311a is displayed on the rear surface 324 of the tray 320 in a color distinct from other areas. In addition, various other methods for guiding the attachment area 315 of the tail 311a are applied in the rear surface 324 of the tray 320. Also, the tail of the base film 311 is disposed at various other positions, and an attachment area including a corresponding guide is provided on the side surface or the rear surface 324 of the tray 320.

According to an embodiment, the tails 311a, 311b of the base film 311 serve as a guide for guiding the arrangement direction of the protective film 312. For example, the tails 311a, 311b of the base film 311 have different shapes each other. According to an embodiment, one tail 311a of the base film 311 is formed to have one edge in a tapered shape 317 different from the other tail 311b.

Referring back to FIG. 3A, according to various embodiments, the protective film package 300 further includes a lower case 330 that is coupled to the tray 320, and the lower case 330 provides a recess 333 by a rectangular bottom plate 331 and vertical sidewalls 332 perpendicular to the bottom plate 331. When the tray 320 is coupled to the lower case 330, the edge extension 325 of the tray 320 is lifted over the top surface 334 of the side walls 332, or a chin (not shown) in which the upper inner portion of the side walls 332 is removed whereby the tray 320 is in the lower case 330 in a stable state (or stably seated state) without shaking. The recess 333 of the lower case 330 is used as a storage space in which accessories related to the electronic device 350, for example, earphones, chargers, screen dusters (microfiber cloths), or instruction documents are disposed.

According to various embodiments, the protective film package 300 further includes an upper case (or a cover) (not shown) that is coupled with the lower case 330 to cover the tray 320.

Figure 4A:
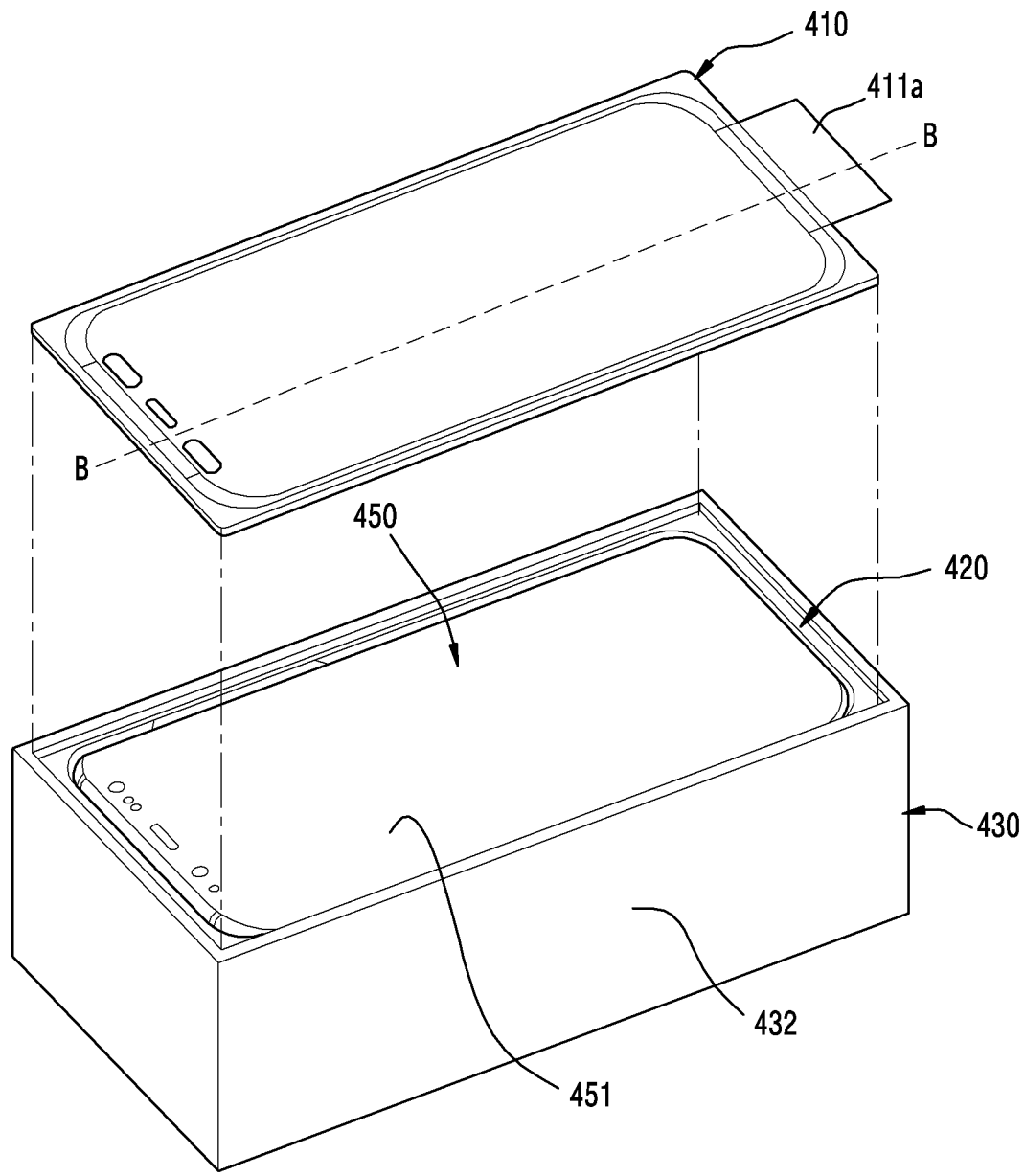
FIG. 4A is a perspective view illustrating a coupling between a protective film and an electronic device using a protective film package according to various embodiments.
Figure 4B:
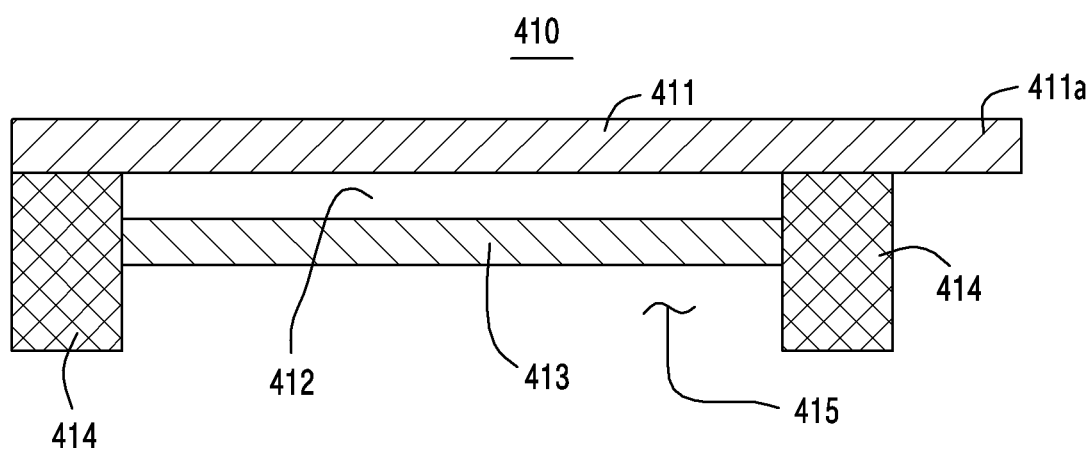
FIG. 4B is a cross-sectional view of the B-B portion of the protective film set included in the protective film package of FIG. 4A.
Figure 4C:
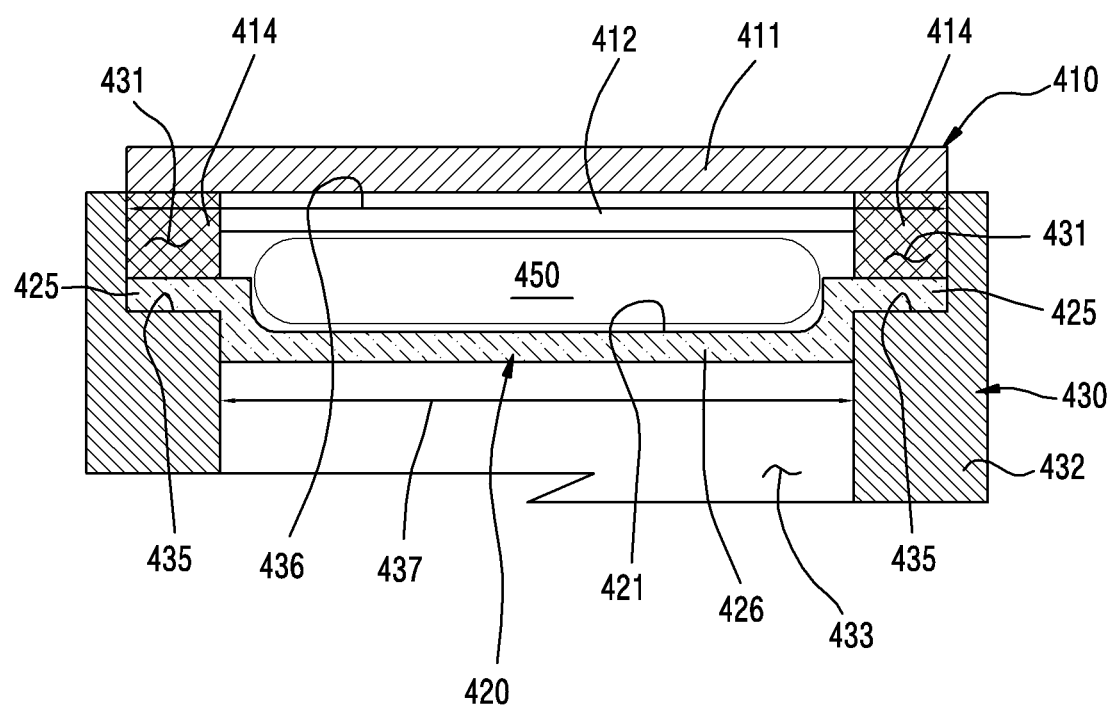
FIG. 4C is a cross-sectional view of a coupling state between the protective film package and the electronic device of FIG. 4A.

FIG. 4A is a perspective view illustrating a coupling between a protective film and an electronic device using a protective film package 400 according to various embodiments. FIG. 4B is a cross-sectional view of the B-B portion of a protective film set 410 included in the protective film package in FIG. 4A. FIG. 4C is a cross-sectional view of a coupling state between the protective film package and the electronic device in FIG. 4A.

Referring to FIG. 4A, the protective film package 400 according to an embodiment includes a protective film set 410, a tray 420, and a case 430.

Referring to FIG. 4B and FIG. 4C, the protective film set 410 according to an embodiment includes a base film 411, a protective film 412, a release film 413 and a frame 414. The base film 411 is detachably coupled to the protective film 412, and its rear surface includes an adhesive material for holding the protective film 412. The protective film 412 is disposed between the base film 411 and the release film 413, and the rear surface of the protective film 412 includes an adhesive surface for attachment to the front plate 451 of the electronic device 450. The protective film 412 is formed of a structure similar or identical to the protective film 220 of FIG. 2B. The release film 413 is detachably coupled to the rear surface of the protective film 412 to protect the adhesive surface formed on the rear surface of the protective film 412. The frame 414 is a structure that surrounds the protective film 412 and the release film 413 laterally, and is fixed to the protective film 412 by an adhesive material disposed on the rear surface of the base film 411. The frame 414 is separated from the protective film 412 and the release film 413.

According to an embodiment, the frame 414 is formed with a thickness greater than the accumulated thickness of the protective film 412 and the release film 413, whereby the recess 415 for accommodating a portion of the electronic device 450 is provided between the frame 414 and the release film 413.

According to an embodiment, the tray 420 includes a recess 421, and when the electronic device 450 is disposed in the recess 421, the electronic device 450 is in a stable state (or stably seated state) without shaking.

According to an embodiment, the case 430 (e.g., the lower case 330 in FIG. 3A) includes a bottom plate (not shown) and side walls 432 to provide a recess 433. According to an embodiment, the sidewalls 432 of the case 430 includes a jaw (or stepped surface) 435 in which a portion of the upper inner portion of the sidewalls 432 is removed to seat the tray 420. Due to the structure of forming the jaw 435, the recess 433 of the case 430 has a first space 436 having a first width and a second space 437, disposed below the first space 436, having a second width greater than the first width 436. The tray 420 includes a central portion 426 forming a recess 421 and an edge extension portion 425 extending from the central portion 426. When the tray 420 is coupled with the case 430, the edge extension portion 425 is lifted over the jaw 435 of the side walls 432 and placed in the first space 436, and the central portion 426 is disposed in the second space 437. The first space 436 is formed for fitting for the edge extension 425, or the second space 437 is formed for fitting for the central portion 426, whereby the tray 420 in the case 430 is in a stable state (or a stably seated state) without shaking.

According to an embodiment, when the tray 420 is seated on the case 430, some space 431 of the first space 436 is empty, and the remaining structure (e.g., base film 411, protective film 412, and frame 414) after the release film 413 is separated from the protective film set 410 fits into this empty space 431 in the case 430 in a stable state without shaking. The frame 414 of the protective film set 410 is disposed on the edge extension 425 of the tray 420 and is designed to fit into the space 431. The protective film 412 is accurately aligned with the electronic device 450 by the operation of seating the electronic device 450 on the tray 420 and the operation of seating the tray 420 on the case 430. In the structure of FIG. 4C, an operation of pressing and rubbing the base film 411 is performed such that the adhesive layer formed on the rear surface of the protective film 412 is tightly attached to the electronic device 450. Since the base film 411 and the protective film 412 have flexibility, the protective film 412 is adhered to the curved area of the electronic device 450 by pressing and rubbing the base film 411. According to some embodiments, when the structure of FIG. 4C is formed, a portion of the protective film 412 is placed in a state attached to the electronic device 450, and after removing the base film 411, a pressing and rubbing operation for the protective film 412 is performed such that the adhesive layer formed on the rear surface of the protective film 412 is tightly attached to the electronic device 450.

According to various embodiments, the protective film 412 includes a photo-curing layer (e.g., the photo-curing layer 2231 in FIG. 2A) disposed therein, and after adhering the protective film 412 tightly to an electronic device 450, the operation of curing the photo-curing layer using light is further performed.

According to various embodiments, the base film 411 includes a tail 411a, and the tail 411a is utilized as a handle to separate the base film 411 from the protective film 412 and the frame 414.

Figure 5:
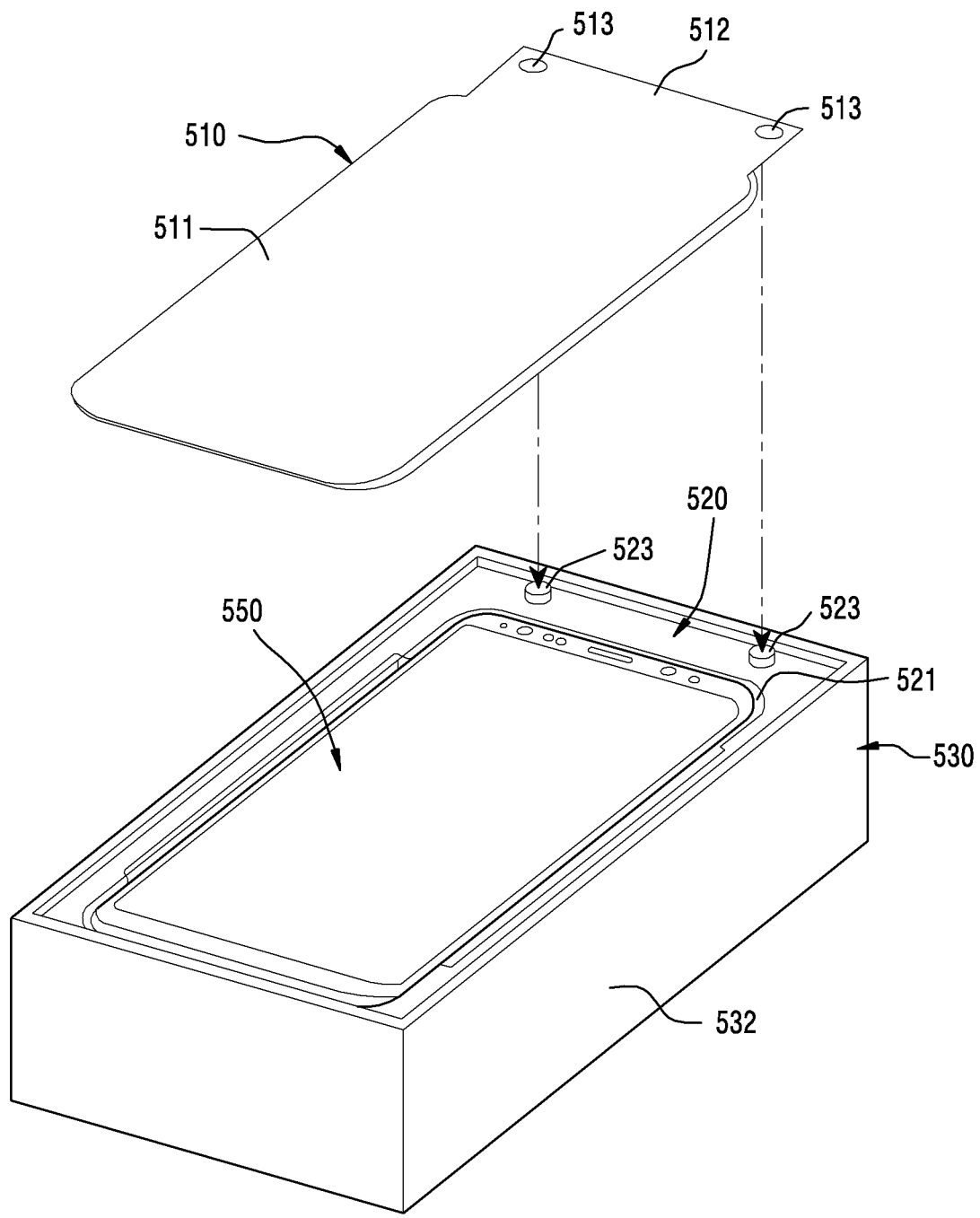
FIG. 5 is a perspective view illustrating a coupling between a protective film and an electronic device using a protective film package according to various embodiments.

FIG. 5 is a perspective view illustrating a coupling between a protective film and an electronic device using a protective film package according to various embodiments.

Referring to FIG. 5, the protective film package 500 according to an embodiment includes a protective film set 510, a tray 520, and a case 530.

According to an embodiment, the protective film set 510 includes a base film 511, a protective film (not shown), and a release film (not shown). The protective film of the protective film set 510 is formed in a structure similar or identical to the protective film 220 in FIG. 2B. The release film of the protective film set 510 is similar to or the same as the release film 220 in FIG. 2B.

According to an embodiment, the base film 511 is detachably coupled to the protective film, and its rear surface includes an adhesive material for holding the protective film. According to an embodiment, the base film 511 includes an extension portion 512 including one or more holes 513.

According to an embodiment, the tray 520 includes a recess 521 and when an electronic device 550 (e.g., an electronic device 100 in FIG. 1A) is arranged in the tray 520, the electronic device 550 is in a stable state (or stably seated state) without shaking. According to an embodiment, the tray 520 includes a protrusion 523 corresponding to one or more holes 513 of the base film 511. The base film 511 and the protective film remaining after separating the release film from the protective film set 510 are coupled with trays such that the protrusions 523 of the tray 520 penetrate each of the holes 513 of the base film 511, whereby the protective film is accurately aligned to the electronic device 550 seated in the tray 520.

According to an embodiment, the protrusion 523 of the tray 520 is designed for inserting the holes 513 of the base film 511 without a gap (or less than a set tolerance). The protrusion 523 is similar to a cylinder as shown, but is not limited thereto, and is formed of a pillar having various cross-sectional shapes.

According to an embodiment, the case 530 is a structure including a bottom plate (not shown) and side walls 532, similar to or the same as the lower case 330 in FIG. 3A or the case 430 in FIG. 4A. When the tray 520 is coupled to the case 530, the tray 520 is lifted over a jaw (not shown) which is formed by removing the upper inner part of the side walls 532, thereby the tray 520 is in the case 530 in a stable state (or stably seated state) without shaking.

According to some embodiments, although not shown, instead of the protrusion 523 of the tray 520, the case 530 is designed to have a protrusion. In this case, the tray 520 includes an opening corresponding to the protrusion of the case 530.

According to some embodiments, although not shown, instead of the protrusion 523 of the tray 520, the base film 511 is designed to have a protrusion. In this case, the tray 520 includes an opening corresponding to the protrusion of the base film 511.

Figure 6A:
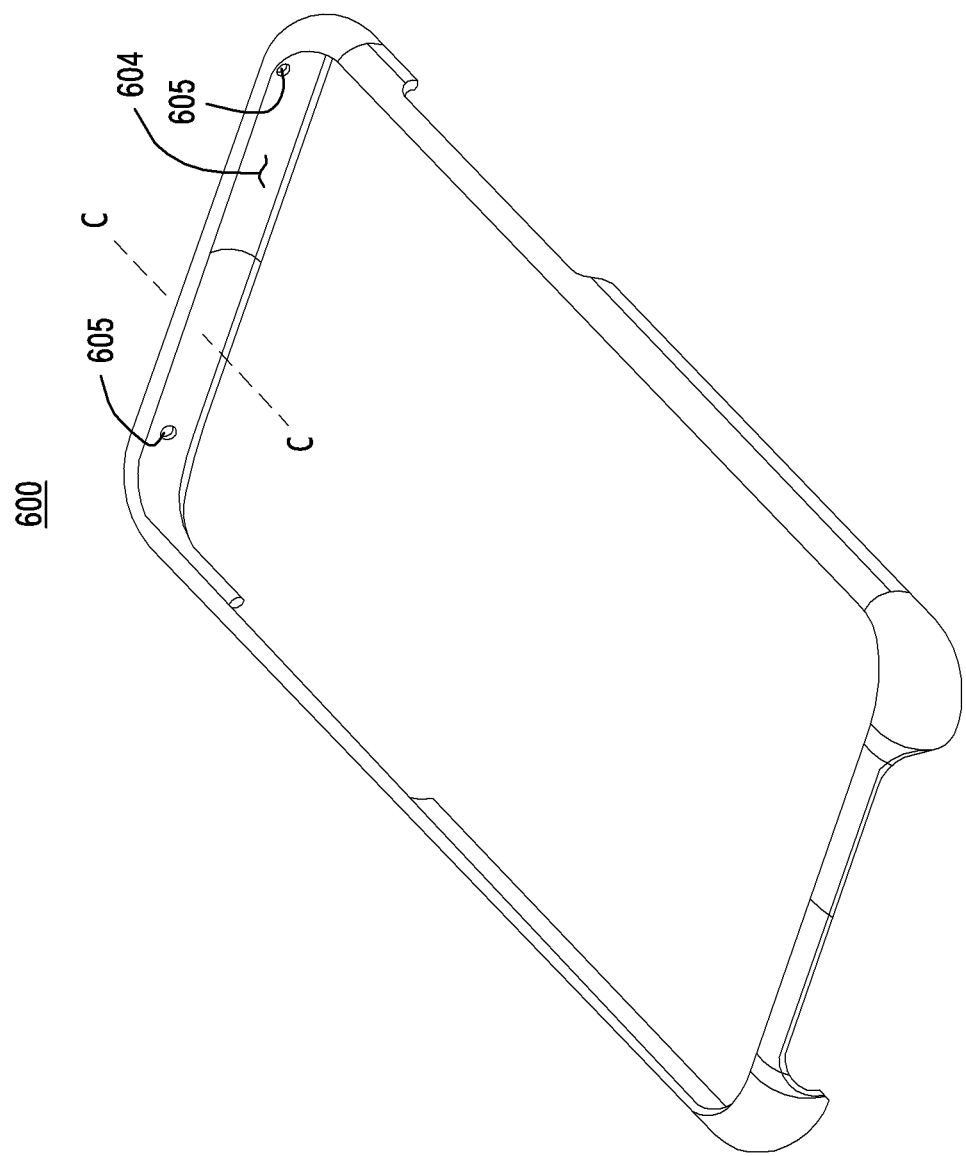
FIG. 6A is a perspective view of a support structure for preventing lifting of the protective film when curing the photo-curing layer included in the protective film according to an embodiment.
Figure 6B:
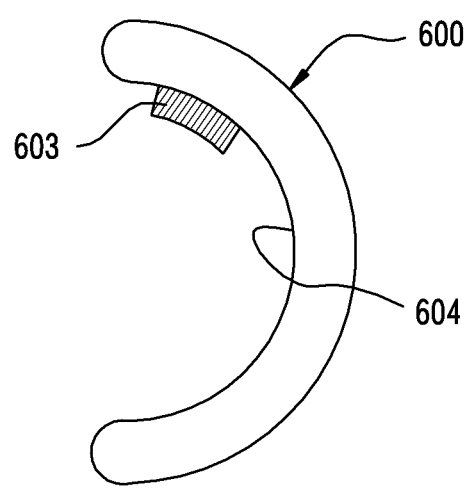
FIG. 6B is a cross-sectional view of the C-C portion in the support structure of FIG. 6A.
Figure 6C:
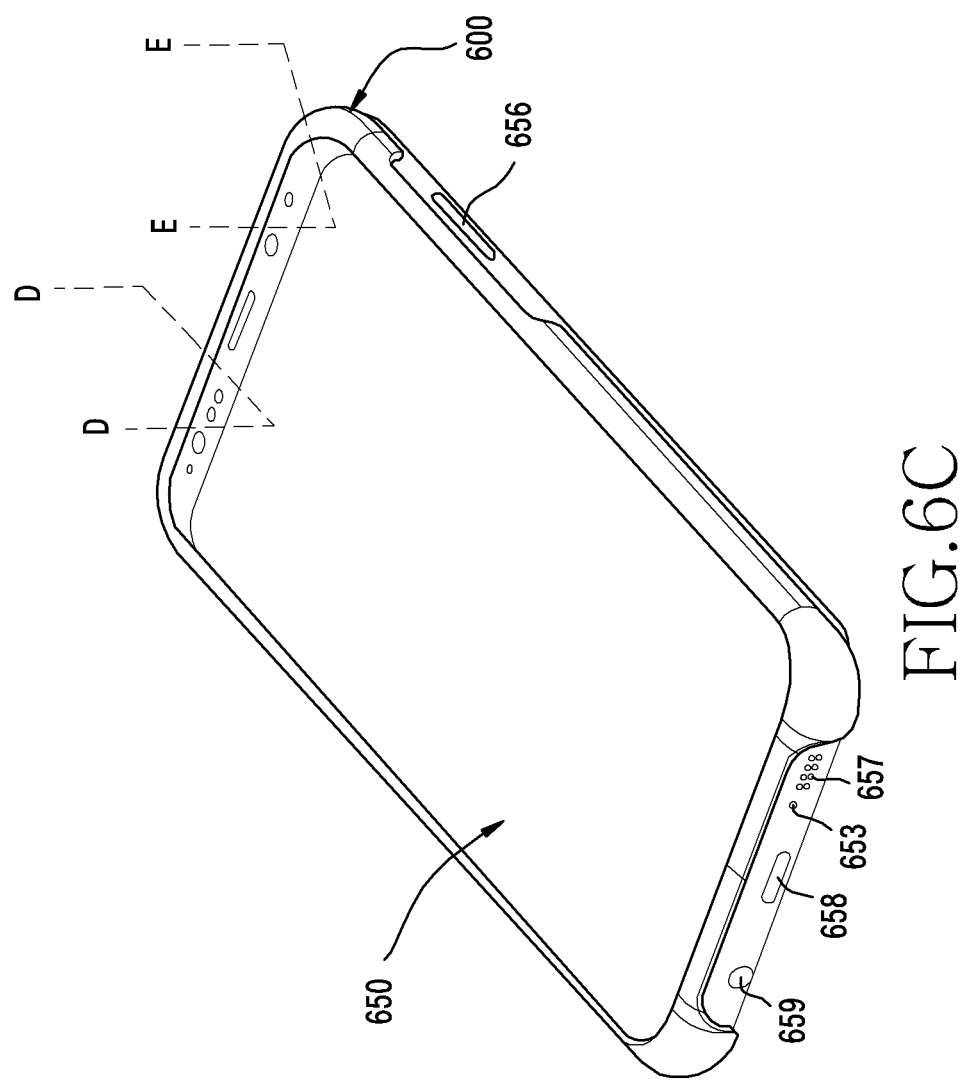
FIG. 6C is a perspective view showing a state in which the support structure of FIG. 6A is coupled to an electronic device to which a flexible film including a protective film is attached.
Figure 6D:
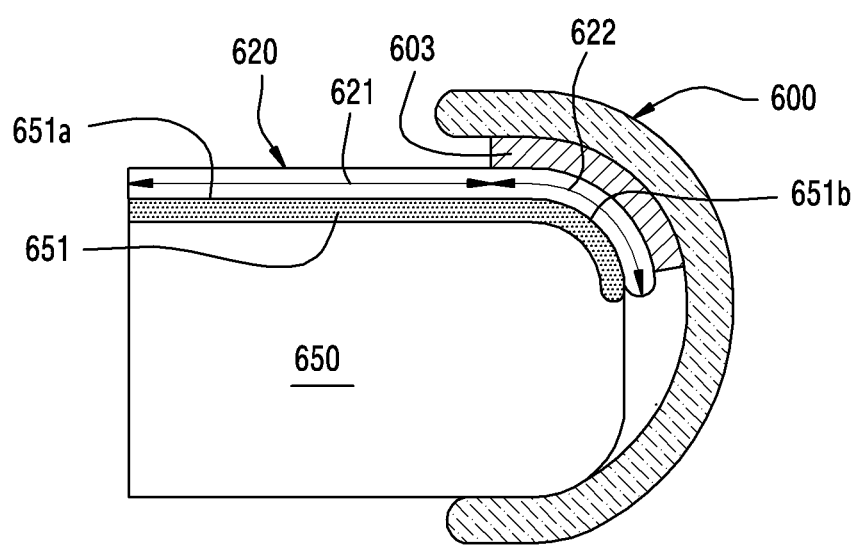
FIG. 6d is a cross-sectional view of the portion D-D in the coupling structure of FIG. 6c.

FIG. 6A is a perspective view of a support structure for preventing lifting of the protective film during curing the photo-curing layer included in the protective film according to an embodiment. FIG. 6B is a cross-sectional view of the C-C portion in the support structure in FIG. 6A. FIG. 6C is a perspective view showing a state in which the support structure in FIG. 6A is coupled to an electronic device to which a flexible film including a protective film is attached. FIG. 6D is a cross-sectional view of the portion D-D in the coupling structure of FIG. 6C.

Referring to FIGS. 6A, 6B, 6C and 6D, in an embodiment, the electronic device 650 (e.g., an electronic device 100 in FIG. 1A or the electronic device 250 in FIG. 2A) has a front plate 651 (e.g., 102 in FIG. 1A) which forms an outer surface, and the outer surfaces 651a and 651b formed by the front plate 651 include substantially planar areas (hereinafter, planar areas) 651a and an edge area (hereinafter, a curved area) 651b which is a curved surface smoothly and inclinedly connected to planar areas 651a. According to an embodiment, the flexible film 620 formed by the base film (e.g., the base film 210 in FIG. 2A) and a protective film (the example, the protective film 220 in FIG. 2A) is attached to the front plate 651 using the adhesive surface formed on the rear surface of the protective film as a medium. The protective film of the flexible film 620 includes a photo-curing layer (e.g., the photo-curing layer 2231 in FIG. 2B), and before the photo-curing layer is fully cured, the corresponding portion 622 (hereinafter, the curved cover portion) of the flexible film 620 which covers the curved area 651b is lifted over with respect to the curved areas 651b. According to an embodiment, the photo-curing support structure 600 is an annular shape detachably coupled to the electronic device 650 and disposed along the side of the electronic device 650. According to an embodiment, the photo-curing support structure 600 has an extended curved cross section so as to be coupled to a side of the electronic device 650, and is coupled to the electronic device 650 or is separated from the electronic device 650 using its own elasticity. According to an embodiment, when the photo-curing support structure 600 and the electronic device 650 are coupled, the photo-curing support structure 600 presses the curved cover portion 622 of the flexible film 620 to the front plate 651, whereby lifting the curved cover portion 622 against the front plate 651 is prevented while the photo-curing layer is cured.

According to various embodiments, the photo-curing support structure 600 is designed in an expanded form to cover at least a portion of a planar cover portion 621 in order to press a part (hereinafter, the planar cover portion 621) of the flexible film 620 covering the planar area 651a of the front plate 651 to the front plate 651.

According to an embodiment, the photo-curing support structure 600 has light-transmitting properties, whereby the amount of light required to cure the photo-curing layer of the protective film is secured.

According to various embodiments, the photo-curing support structure 600 includes a flexible member 603 disposed along the flexible film 620. The flexible film 620 is elastically adhered toward the front plate 651 by the flexible member 603. In various embodiments, the flexible member 603, as shown in the E-E portion in FIG. 6C, is disposed along the curved surface areas (e.g., the curved surface area 206, 207, 208, 209 in FIG. 2A) which are rounded shape for smoothly connecting the curved surfaces (e.g., curved surfaces 202, 203, 204, 205 in FIG. 2A) having different inclinations (or curvatures) or the same inclinations (or curvatures).

According to some embodiments, instead of the flexible member 603, it is also possible to form the inner area of the photo-curing support structure 600 (the area indicated by '604' in FIG. 6A or 6B) by an elastic material.

According to various embodiments, the photo-curing support structure 600 includes one or more holes 605. When the photo-curing support structure 600 is coupled to the electronic device 650, an air between the photo-curing support structure 600 and the electronic device 650 is discharged through one or more holes 605, thereby the photo-curing support structure 600 is smoothly coupled to the electronic device 650. According to various embodiments, the one or more holes 605 is extended than the illustrated size, so that the photo-curing support structure 600 is more resiliently coupled to the electronic device 650.

According to various embodiments, the photo-curing support structure 600 is formed so as not to cover a key input unit 656 (e.g., key input device 117 in FIG. 1A), speaker holes 657 (e.g. speaker hole 107 in FIG. 1A), a microphone hole 653 (e.g., microphone hole 103 in FIG. 1A), connector holes 658, 659 (e.g., connector holes 108, 109 in FIG. 1A) included in the electronic device 650.

According to various embodiments, after the photo-curing layer included in the protective film of the flexible film 620 is cured, the photo-curing support structure 600 is separated from the electronic device 650 and the base of the flexible film 620 is separated from the protective film, and then, adhesion of the protective film is completed.

According to some embodiments, after placing the flexible film 620 on the electronic device 650 and separating the base film from the protective film, curing the photo-curing layer of the protective film is also performed by coupling the photo-curing support structure 600 to the electronic device 650.

Figure 7A:
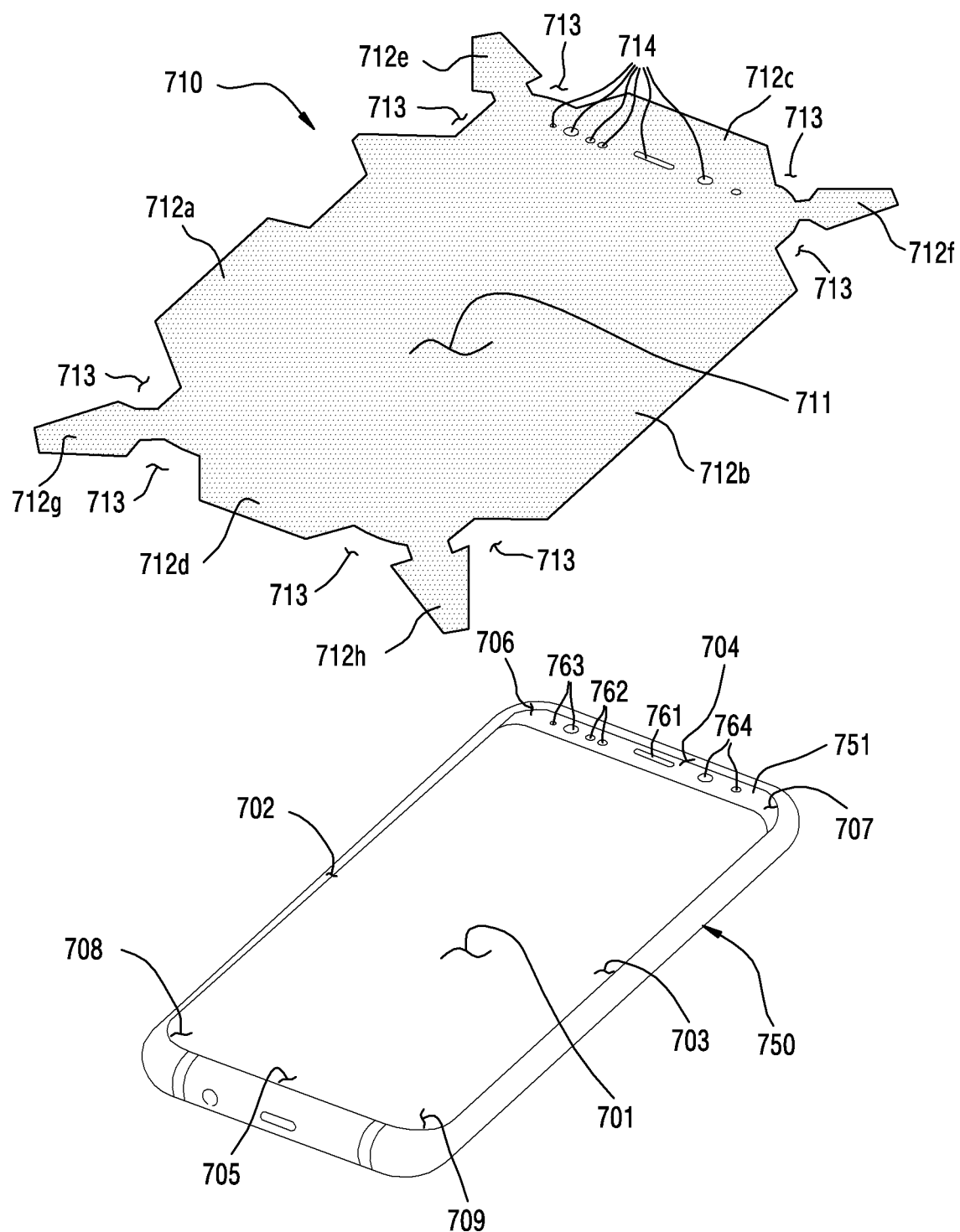
FIG. 7A is an exploded perspective view of a flexible film including a base film and a protective film and an electronic device according to various embodiments.
Figure 7B:
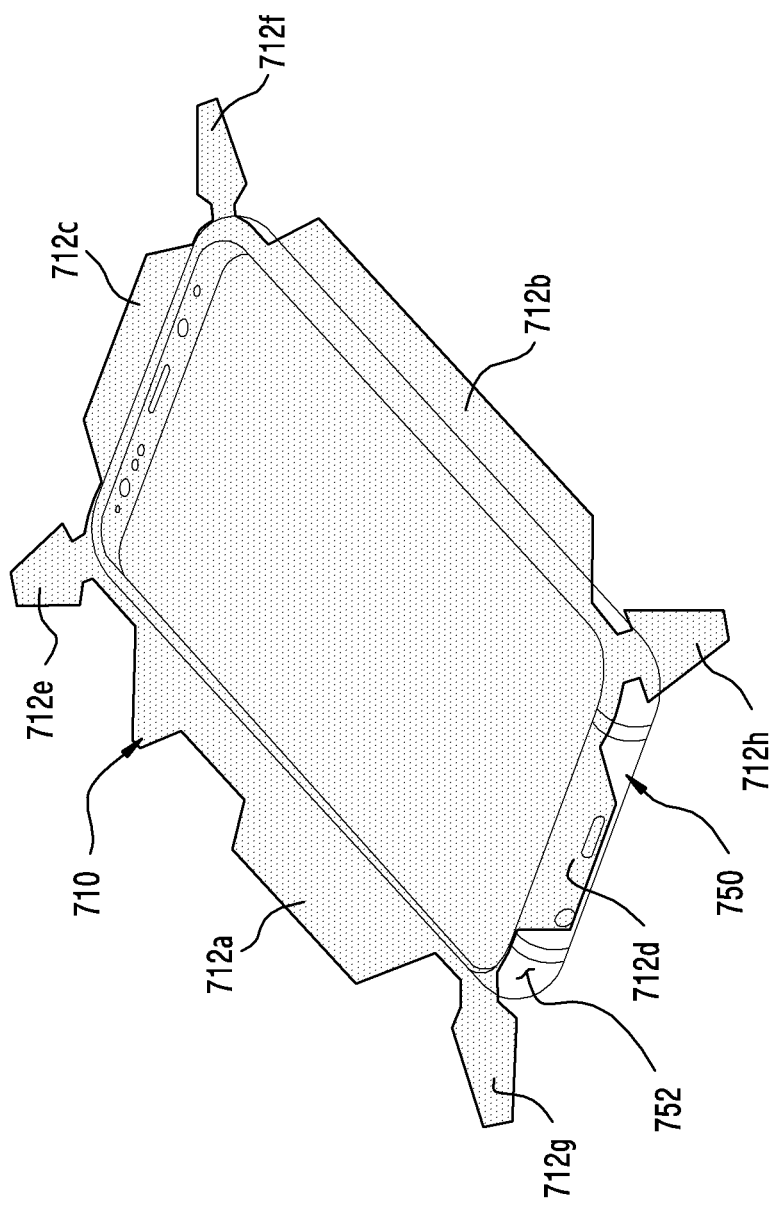
FIG. 7B is a front perspective view of the electronic device in which the flexible film of FIG. 7A is disposed.
Figure 7C:
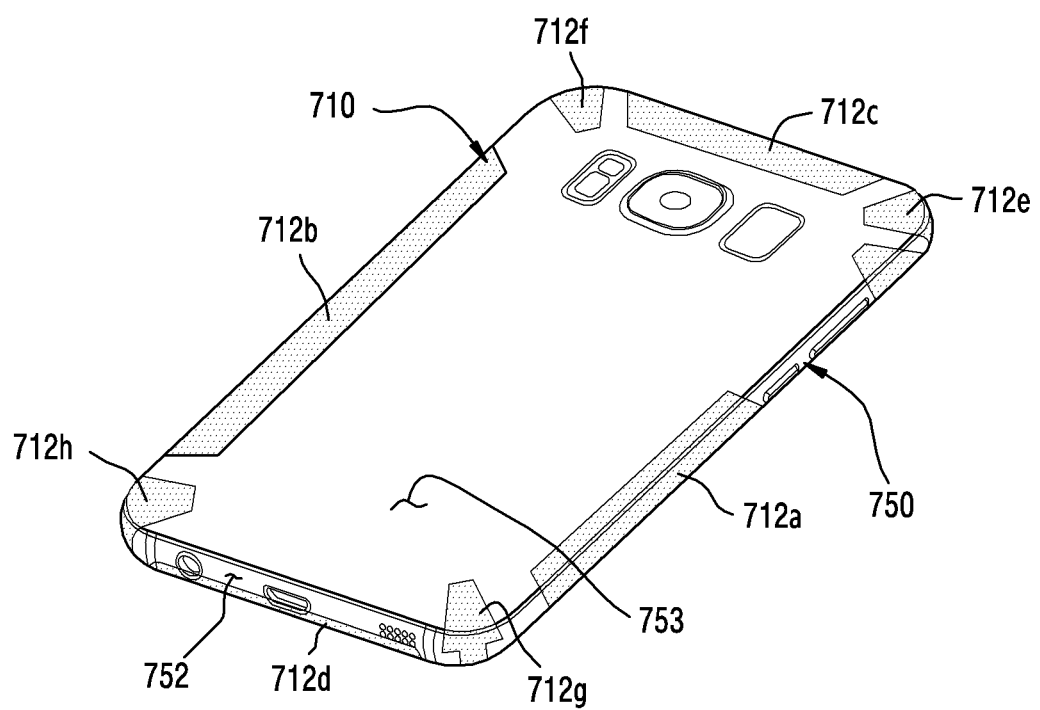
FIG. 7C is a rear perspective view of the electronic device in which the flexible film of FIG. 7A is disposed.

FIG. 7A is an exploded perspective view of a flexible film and an electronic device including a base film and a protective film according to various embodiments. FIG. 7B is a front perspective view of the electronic device in which the flexible film in FIG. 7A is disposed. FIG. 7C is a rear perspective view of the electronic device in which the flexible film in FIG. 7A is disposed.

Referring to FIGS. 7A, 7B and 7C, a flexible film 700 includes a base film 710 and the protective film 720 (e.g., the protective film 220 in FIG. 2A). The protective film 720 is attached to a front plate 751 (e.g., the front plate 102 in FIG. 1A) of an electronic device 750 using the adhesive layer formed on its rear surface as a medium. The protective film 720 is disposed along the planar area 701 (e.g., planar area 201 in FIG. 2A) and the curved areas 702, 703, 704, 705, 706, 707, 708, 709 (e.g., curved areas 202, 203, 204, 205, 206, 207, 208, 209 in FIG. 2A) of the front plate 751. The base film 710 refers to a layer detachably coupled to the protective film 720, and its rear surface includes an adhesive material for holding the protective film 720. According to an embodiment, the base film 710 includes a fifth area 711 covering the protective film 720 and sixth areas 712*a*, 712*b*, 712*c*, 712*d* 712*e*, 712*f*, 712*g*, 712*h* extending from the fifth area 711. The sixth areas 712*a*, 712*b*, 712*c*, 712*d*, 712*e*, 712*f*, 712*g*, 712*h* are divided by slits 713 formed in the base film 710, and are formed corresponding to the curved areas 702, 703, 704, 705, 706, 707, 708, 709. According to an embodiment, the sixth areas 712*a*, 712*b*, 712*c*, 712*d*, 712*e*, 712*f*, 712*g*, 712*h* are bent as shown in FIG. 7B, and adhered to the side surface 752 or the rear surface 753 of the electronic device 750 using the adhesive layer formed on its rear surface as a medium, whereby the protective film 720 and the front plate are tightly adhered. The sixth areas 712*a*, 712*b*, 712*c*, 712*d*, 712*e*, 712*f*, 712*g*, 712*h* are formed in a lengths size or a shape which do not cover the devices disposed on the side surface 752 or the rear surface 753 of the electronic device 750 (e.g., a key input device 711, connector holes 712, 713, microphone hole 714, speaker hole 715).

According to various embodiments, the base film 710 includes holes 714 for exposing at least one of a hole 761 arranged with a call receiver, a light transmitting area 762 aligned with an optical sensor, a light transmitting area 763 aligned with a light emitting device, or a light transmitting area 763 aligned with a camera device.

According to an embodiment, the protective film 720 includes a photo-curing layer, and sixth areas 712*a*, 712*b*, 712*c* 712*d*, 712*e*, 712*f*, 712*g*, 712*h* attached to the side surface 752 or the rear surface 753 of the electronic device 750 prevents the protective film 720 from lifting against the front plate 751 while curing the photo-curing layer. According to an embodiment, the base film 710 is designed to have a light-transmitting property to secure the amount of light required to cure the photo-curing layer. When the photo-curing layer is cured, the protective film 720 is maintained in a form corresponding to the planar area 701 and the curved areas 702, 703, 704, 705, 706, 707, 708, 709 of the front plate 751. After the photo-curing layer of the protective film 720 is cured, the base film 710 is separated from the protective film 720, and thus, the attachment of the protective film 720 is completed. According to some embodiments, the base film 710 is defined as a photo-curing support structure.

Figure 8A:
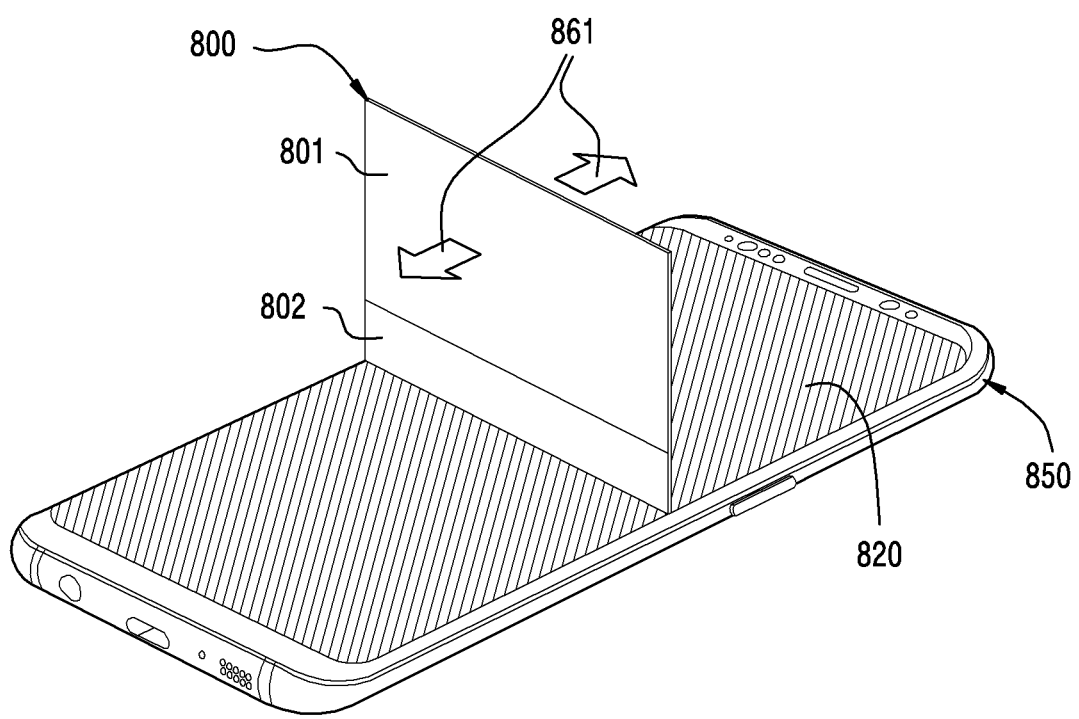
FIG. 8A is a front perspective view of an operation in which a protective film is tightly adhered to an electronic device using a support structure according to various embodiments.
Figure 8B:
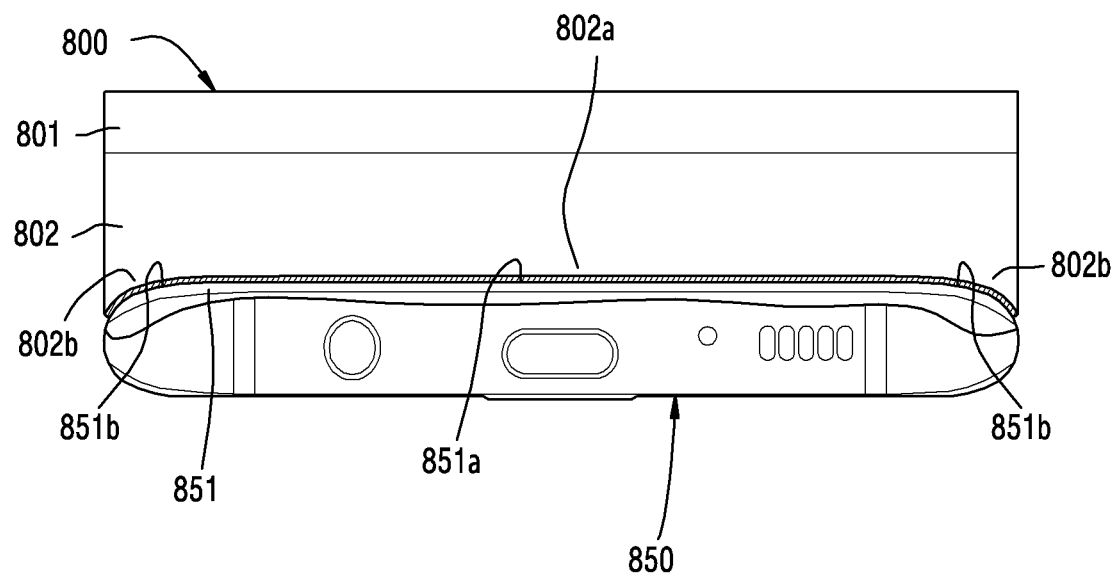
FIG. 8B is a partial cross-sectional view of the operation of tightly adhering the protective film to the electronic device using the support structure of FIG. 8A.

FIG. 8A is a front perspective view of an operation in which a protective film is tightly adhered to an electronic device using a support structure according to various embodiments. FIG. 8B is a partial cross-sectional view of the operation of tightly adhering the protective film to the electronic device using the support structure of FIG. 8A.

Referring to FIG. 8A and FIG. 8B, the support structure 800 according to an embodiment includes a handle 801 and a pressing member 802. By Holding the handle 801 and by pressing and rubbing the pressing member 802 for the protective film 820 disposed on the front plate 851 of the electronic device 850, lifting and air bubbles between the protective film 820 and the front plate 851 are avoided, thereby the protective film 820 is attached to the front plate 851 without gaps.

According to an embodiment, the protective film 820 is disposed along planar area 851*a* (e.g., planar area 201 in FIG. 2A) and curved areas 851*b* (e.g., the curved areas 202, 203, 204, 205, 206, 207, 208, 209 in FIG. 2A) of the front plate 851 of the electronic device 850. According to an embodiment, the pressing member 802 has a flat end 802*a* corresponding to the planar area 851*a* of the front plate 851 and a curved end 802*b* corresponding to the curved areas 851*b* of the front plate 851. After aligning the flat ends 802*a* and the curved ends 802*b* of the pressing member 820 to the planar area 851*a* and the curved areas 851*b* of the front plate 851, respectively, the protective film 820 is attached to the front plate 851 without gaps by pressing the protective film 820 and moving the support structure 800 in the long direction 861 of the electronic device 850.

According to various embodiments, the pressing member 802 is formed of a flexible material, whereby the protective film 820 is elastically pressed toward the front plate 851 by the pressing member 802. According to some embodiments, when the pressing member 802 is flexible, the curved end 802*b* of the pressing member 820 is formed as a flat end.

According to various embodiments, the support structure 800 is designed in a plate shape as illustrated, but of course, it is designed in various other shapes. For example, although not shown, the support structure is designed in a shape having an annular handle and a contact member disposed inside the handle. When the electronic device 850 on which the protective film 820 is disposed passes through an annular handle, the contact member disposed inside the handle presses the protective film 820 toward the front plate 851.

According to various embodiments, the protective film 820 is replaced with the base film 210 and the protective film 220 remaining after separating the release film 230 from the protective film set 200 in FIG. 2A. In this case, attachment of the protective film 220 is completed by the operation of tightly attaching the protective film 220 to the front plate 851 using the support structure 800, and curing the photo-curing layer in the protective film 220, and then separating the base film 210 from the protective film 220.

According to an embodiment of the present invention, the protective film package (e.g., protective film package 300 in FIG. 3A) includes a tray 320 including a recess 321 on which the electronic device 350 including a front plate 351 for exposing the display is mounted, a protective film (e.g., protective film in FIG. 2B) which is attached to the front plate 351 of the electronic device 350 and includes the photo-curing layer (e.g., photo-curing layer 2231 in FIG. 2B), and a photo-curing support structure detachably coupled to the electronic device. When the tray 320 on which the electronic device 350 is mounted and the protective film 220 are aligned, the protective film 220 is disposed at a set position on the front plate 351. When the photo-curing support structure is coupled with the electronic device 350 on which the protective film 220 is disposed, at least a portion of the edge of the protective film 220 is pressed to the front plate 351 by the photo-curing support structure.

According to an embodiment of the invention, at least a portion of the edge of the protective film 220 covers the curved surface (e.g., curved areas 202, 203, 204, 205, 206, 207, 208, 209 in FIG. 2A) formed by the front plate (e.g., front plate 251 in FIG. 2A).

According to an embodiment of the present invention, the curved surface covered by at least a portion of the edge of the protective film 220 in the front plate (e.g., front plate 251 in FIG. 2A) includes a first curved surface and a second curved surface extending perpendicularly to each other, and a third curved surface 206, 207, 208, 209 (e.g., fourth areas or corner areas in FIG. 2A) that smoothly connect the first curved surface and the second curved surface.

According to an embodiment of the present invention, the first curved surface (e.g., the left area 202) and the second curved surface (e.g., the right area 203) has different inclinations or curvatures.

According to an embodiment of the present invention, at least a portion of the edge of the protective film 220 includes one or more slits 229 formed in a portion covering the third curved surface in order to bend at least a portion of the edge of the protective film along the third curved surface 206, 207, 208, 209 (e.g., the fourth areas or corner areas in FIG. 2A).

According to an embodiment of the present invention, the photo-curing support structure 600 is an annular shape extended to cover a side of the electronic device and a portion of the front plate, and is coupled to or detached from an electronic device using its own elasticity.

According to an embodiment of the present invention, the photo-curing support structure 600 further includes a flexible member 603 disposed between at least a portion of the edge of the protective film and the front plate.

According to an embodiment of the present invention, the photo-curing support structure 600 includes a light-transmitting material capable of passing a light for curing the photo-curing layer.

According to an embodiment of the present invention, the photo-curing support structure (e.g., the base film 710 in FIG. 7) includes an adhesive material for holding the protective film on its rear surface, and it is a top film detachably stacked on the protective film. The top film 710 is extended to be attached to the side surface or back surface 753 of the electronic device on which the protective film is disposed.

According to an embodiment of the present invention, the protective film package 300 includes an adhesive material for holding the protective film on its rear surface, and further includes a top film detachably laminated on the protective film (e.g., base film 210 in FIG. 2A).

According to an embodiment of the present invention, the top film 210 includes a light-transmitting material capable of passing a light for curing the photo-curing layer.

According to an embodiment of the invention, the tray (e.g., the tray 520 in FIG. 5) includes at least one protrusion 523, and the top film (e.g., base film 511 in FIG. 5A) includes at least one hole 513 disposed for inserting the at least one protrusion 523 when the tray 520 on which the electronic device is seated and the protective film are aligned.

According to an embodiment of the invention, the top film (e.g., base film 311 in FIG. 3A) extends to be attached to the rear surface of the tray (e.g., tray 320 of FIG. 3A) on which the electronic device is mounted.

According to an embodiment of the invention, an area 315 to which the top film 311 is attached is indicated in the rear surface of the tray (e.g., tray 320 in FIG. 3C).

According to an embodiment of the invention, a guide line defining an area 315 to which the top film 311 is attached is indicated in the rear surface of the tray (e.g., tray 320 in FIG. 3C).

According to an embodiment of the invention, a recess corresponding to the area 315 to which the top film 311 is attached is formed in the rear surface of the tray (e.g., tray 320 in FIG. 3C).

According to an embodiment of the invention, the top film (e.g., base film 311 in FIG. 3A) includes an area disposed along the protective film and a plurality of extension areas (e.g., tails 311a, 311b in FIG. 3D). And at least one extension area 311a, among the plurality of extension areas, attached to the rear surface of the tray has a different shape from the remaining extension areas 311b.

According to an embodiment of the present invention, the protective film package 300 further includes a case, for providing a recess 333, including a bottom plate 331 and side walls 332 perpendicular to the bottom plate 331. The tray 320 is lifted over the side walls 332 and seated on the case. When the tray 320 on which the electronic device 350 is seated is seated on the case 330, and when the protective film is aligned with the case 330, the protective film is placed at a set position on the front plate 351.

According to an embodiment of the present invention, the protective film package is attached to the rear surface of the top film 411, and further includes a frame laterally surrounding the protective film 312 (e.g., frame 414 in FIG. 4B). The case (e.g., case 430 in FIG. 4C) includes a jaw 435 formed by removing a part of the inner portion of the top of the sidewalls 432, and the tray 420 includes an extension portion 425 lifted over the jaw 435. The frame 414 is fitted into a space 431 formed by the side walls 432 on the extension portion 425 when the protective film 412 is aligned with the case 430.

According to an embodiment of the invention, the protective film (e.g., protective film 220 in FIG. 2b) includes a first base layer 2211, a second base layer 2221 disposed below the first base layer 2211, a photo-curing layer disposed between the first base layer 2211 and the second base layer 2221, a hard coating layer 2241 disposed over the first base layer 2211 and an adhesive layer 2251 disposed under the second base layer 2221.

The present disclosure has been described above with reference to preferred embodiments thereof. It will be understood by those skilled in the art that various changes in form and details is made therein without departing from the spirit and scope of the invention as defined by the appended claims. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present disclosure.

The invention claimed is:

1. A protective film package comprising:
    a tray including a recess for seating an electronic device including a front plate exposing a display;
    a protective film including a photo-curing layer wherein the protective film is attached to the front plate of the electronic device and; and a photo-curing support structure detachably coupled with the electronic device,
wherein the protective film is disposed at a predetermined position on the front plate based on that the tray on which the electronic device is seated and the protective film are aligned,
wherein at least a portion of an edge of the protective film is pressed to the front plate by based on that the photo-curing support structure is coupled with the electronic device on which the protective film is disposed.

2. The protective film package of claim 1, wherein the at least a portion of the edge of the protective film covers a curved surface formed by the front plate.

3. The protective film package of claim 2, wherein the curved surface covered by the at least a portion of the edge of the protective film includes a first curved surface and a second curved surface extending perpendicularly to each other and a third curved surface smoothly connecting the first curved surface and the second curved surface, and
wherein the first curved surface and the second curved surface have the same or different inclination or curvature.

4. The protective film package of claim 3, wherein the at least a portion of the edge of the protective film includes one or more slits formed in a portion covering the third curved surface so that the at least a portion of the edge of the protective film is bent along the third curved surface.

5. The protective film package of claim 2, wherein the photo-curing support structure forms an annular shape extended to cover a side surface of the electronic device and a portion of the front plate, and is coupled to or detachable from the electronic device using its own elasticity.

6. The protective film package of claim 2, wherein the photo-curing support structure further comprises a flexible member disposed between the front plate and the at least a portion of the edge of the protective film.

7. The protective film package of claim 1, wherein the photo-curing support structure comprises a light-transmitting material passing a light to cure the photo-curing layer.

8. The protective film package of claim 1, wherein the photo-curing support structure includes an adhesive material for holding the protective film on a rear surface of the photo-curing support structure, and the adhesive material is a top film detachably laminated to the protective film, and
wherein the top film is extended to be attached to a side surface or a rear surface of the electronic device on which the protective film is disposed.

9. The protective film package of claim 1, wherein a protective film package comprising an adhesive material for holding the protective film on its rear surface, and further comprising a top film detachably stacked on the protective film.

10. The protective film package of claim 9, wherein the top film comprises a light-transmitting material passing a light to cure the photo-curing layer.

11. The protective film package of claim 9, wherein the tray includes at least one protrusion, and
wherein the top film includes at least one hole disposed for inserting of the at least one protrusion when the tray on which the electronic device is seated and the protective film are aligned.

12. The protective film package of claim 9 wherein the top film is extended to be attached to the rear surface of the tray on which the electronic device is seated, and
wherein a rear surface of the tray has an area to which the top film is attached.

13. The protective film package of claim 1, further comprising a case, for providing a recess, including a bottom plate and side walls perpendicular to the bottom plate,
wherein the tray is lifted over the side walls and seated on the case, and
wherein the protective film package is disposed at a predetermined position on the front plate based on that the protective film is aligned to the case when the tray on which the electronic device is seated is seated on the case.

14. The protective film package of claim 13, further comprising a frame which surrounds the protective film laterally and is attached to the rear surface of the top film,
wherein the case includes a jaw formed by removing a part of the upper inner side of the side walls, and the tray includes an extension portion that is lifted over the jaw, and
wherein the frame, when the protective film is aligned to the case, is fitted into the space formed by the side walls on the extension portion.

15. The protective film package of claim 1, wherein the protective film comprises a first base layer, a second base layer disposed under the first base layer, the photo-curing layer disposed between the first base layer and the second base layer, a hard coating layer disposed over the first base layer, and an adhesive layer disposed under the second base layer.

* * * * *